United States Patent
Lane et al.

(10) Patent No.: US 12,298,581 B2
(45) Date of Patent: May 13, 2025

(54) TERMINAL ENCLOSURE FOR A TELECOMMUNICATIONS SYSTEM

(71) Applicant: AFL Telecommunications LLC, Duncan, SC (US)

(72) Inventors: David Lane, Chesnee, SC (US); Cecilia L. Stout, Taylors, SC (US); Mark Vogel, Greenville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 128 days.

(21) Appl. No.: 17/793,510

(22) PCT Filed: Jan. 29, 2021

(86) PCT No.: PCT/US2021/015752
§ 371 (c)(1),
(2) Date: Jul. 18, 2022

(87) PCT Pub. No.: WO2021/155182
PCT Pub. Date: Aug. 5, 2021

(65) Prior Publication Data
US 2023/0040946 A1 Feb. 9, 2023

Related U.S. Application Data

(60) Provisional application No. 62/967,172, filed on Jan. 29, 2020.

(51) Int. Cl.
*G02B 6/44* (2006.01)
(52) U.S. Cl.
CPC ........... *G02B 6/445* (2013.01); *G02B 6/4444* (2013.01); *G02B 6/4452* (2013.01); *G02B 6/4454* (2013.01)

(58) Field of Classification Search
CPC ... G02B 6/4452; G02B 6/44526; G02B 6/445
See application file for complete search history.

(56) References Cited

U.S. PATENT DOCUMENTS 6,061,492 A * 5/2000 Strause ................ G02B 6/4452
385/136
6,383,034 B1 5/2002 Blake
(Continued)

FOREIGN PATENT DOCUMENTS

DE 202009017059 U1 3/2010
EP 1203974 A2 5/2002
(Continued)

OTHER PUBLICATIONS

International Search Report for International Application No. PCT/US2021/015752 dated Aug. 3, 2021; 3 pages.

*Primary Examiner* — Eric Wong
(74) *Attorney, Agent, or Firm* — Dority & Manning, P.A.

(57) ABSTRACT

Telecommunication enclosures are provided. A terminal enclosure for a telecommunications system includes a housing including a base and a cover, the housing defining an internal volume configured to receive one or more telecommunication elements therein, wherein the base includes a first side and a second side opposite the first side, wherein the base and cover are pivotally coupled together at a hinged interface to selectively close the internal volume of the housing, and wherein the hinged interface is reconfigurable between the first and second sides of the base.

20 Claims, 11 Drawing Sheets

(56) References Cited

U.S. PATENT DOCUMENTS

| | | |
|---|---|---|
| 6,621,975 B2 | 9/2003 | Laporte |
| 6,661,961 B1 | 12/2003 | Allen |
| 7,298,950 B2 | 11/2007 | Frohlich |
| 7,298,952 B2 | 11/2007 | Allen |
| 7,333,706 B2 | 2/2008 | Parikh |
| 7,411,126 B2 | 8/2008 | Herzog |
| 7,493,003 B2 | 2/2009 | Kowalczyk |
| 7,589,277 B2 | 9/2009 | Kessler |
| 7,612,300 B2 | 11/2009 | Owens |
| 7,856,166 B2 | 12/2010 | Biribuze |
| 7,901,236 B2 | 3/2011 | Patchett |
| 8,032,002 B2 | 10/2011 | Tang |
| 8,083,300 B2 | 12/2011 | Macall |
| 8,121,458 B2 | 2/2012 | Barth |
| 8,229,265 B2 | 7/2012 | Solheid |
| 8,238,709 B2 | 8/2012 | Solheid |
| 8,357,851 B2 | 1/2013 | Anderson |
| 8,509,586 B2 | 8/2013 | Adomeit |
| 8,891,927 B2 | 11/2014 | Leblanc |
| 9,274,285 B2 | 3/2016 | Courchaine |
| 9,291,790 B2 | 3/2016 | Kimbrell |
| 9,335,504 B2 | 5/2016 | Solheid |
| 9,366,837 B2 | 6/2016 | Claessens |
| 9,429,728 B2 | 8/2016 | Puetz |
| 9,632,269 B1 | 4/2017 | Galvan Mijangos et al. |
| 9,723,733 B2 | 8/2017 | Lebo |
| 9,882,362 B2 | 1/2018 | Carapella |
| 10,031,306 B2 | 7/2018 | Sadasivan |
| 10,036,865 B2 | 7/2018 | Franco |
| 10,197,756 B2 | 2/2019 | Ebrahimi |
| 10,509,187 B2 | 12/2019 | Carapell |
| 10,527,809 B2 | 1/2020 | Solheid |
| 10,666,033 B2 | 5/2020 | Larsson |
| 2006/0153516 A1 | 7/2006 | Napiorkowski |
| 2006/0193588 A1* | 8/2006 | Mertesdorf .......... G02B 6/4442 385/135 |
| 2007/0183732 A1* | 8/2007 | Wittmeier .......... G02B 6/44528 385/135 |
| 2009/0277681 A1 | 11/2009 | Musolf |
| 2011/0091170 A1 | 4/2011 | Bran |
| 2011/0222829 A1* | 9/2011 | Loeffelholz .......... G02B 6/4441 385/135 |
| 2017/0082814 A1 | 3/2017 | Barnes, Jr. |
| 2018/0120527 A1 | 5/2018 | Carapella |
| 2019/0101716 A1 | 4/2019 | Claessens |
| 2019/0196128 A1 | 6/2019 | Grunwald |
| 2021/0055496 A1* | 2/2021 | Allen .................. G02B 6/4471 |
| 2021/0119424 A1* | 4/2021 | Coenegracht .......... E05D 3/022 |

FOREIGN PATENT DOCUMENTS

| | | |
|---|---|---|
| EP | 2182601 B1 | 1/2012 |
| EP | 2643726 A1 | 10/2013 |
| EP | 2661092 B1 | 7/2014 |
| EP | 1914578 B1 | 11/2016 |
| EP | 2426945 B1 | 2/2018 |
| GB | 2441797 B | 11/2009 |
| WO | WO98/32206 A1 | 7/1998 |
| WO | WO2018120527 A1 | 7/2018 |
| WO | WO2019178664 A1 | 9/2019 |
| WO | WO2019241347 A1 | 12/2019 |
| WO | WO2020209982 A1 | 10/2020 |

* cited by examiner

TERMINAL ENCLOSURE FOR A TELECOMMUNICATIONS SYSTEM

CROSS-REFERENCE TO RELATED APPLICATIONS

This present application is a National Stage Patent Application of PCT/US2021/015752, filed on Jan. 29, 2021, which claims priority to U.S. Provisional Patent Application No. 62/967,172 filed on Jan. 29, 2020, the disclosures of all of which are incorporated by reference herein in their entireties.

FIELD

The present disclosure relates generally to telecommunication systems, and more particularly to terminal enclosures for use in telecommunication systems.

BACKGROUND

Telecommunication systems rely on cables to transmit information between two or more locations. To accommodate various end user locations, telecommunication systems typically utilize main fiber trunks extending over long distances and one or more drop cables which transmit the information to terminals where the information can be further routed, e.g., to the individual location where the information is to be received. These terminals may include terminal enclosures which house incoming cables and outgoing cables connected together through one or more telecommunication elements, e.g., splitters, splices, modulating devices, and the like.

Terminal enclosures for telecommunication systems are known. However, issues exist with many known terminal enclosures. For example, splice trays which are used to splice two or more cables in telecommunication enclosures are frequently inconvenient to access, at least in part because they are all secured with hook & loop (e.g. Velcro) fasteners which occupy space and require time to remove. Moreover, terminal cable routing is typically difficult to access and modify after initial installation. That is, after initial on-site installation and setup, it may be difficult to access the cables for further operations, such as site expansion or issue solving. Yet further, entry and exit ports for the cables through known terminal enclosure are typically limited and do not permit easy installation or use of the enclosures. Additionally, various other space and shape limitations exist at the site of installation which increase difficulty of operating on the cables.

Accordingly, improved terminal enclosures are desired in the art. In particular, terminal disclosures which provide efficient use of space and variability in design to permit alternative set up would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a terminal enclosure for a telecommunications system is provided. The terminal enclosure includes housing including a base and a cover, the housing defining an internal volume configured to receive one or more telecommunication elements therein, wherein the base includes a first side and a second side opposite the first side, wherein the base and cover are pivotally coupled together at a hinged interface to selectively close the internal volume of the housing, and wherein the hinged interface is reconfigurable between the first and second sides of the base.

In accordance with another embodiment, a terminal enclosure for a telecommunications system is provided. The terminal enclosure includes a housing including a base and a cover, the housing defining an internal volume configured to receive one or more telecommunication elements therein, wherein the base and cover are pivotally coupled together at a hinged interface to selectively close the internal volume of the housing; and a demarcation panel disposed in the housing and pivotally coupled to the housing through a demarcation panel axis that is approximately orthogonal to an axis of the hinged interface, wherein the demarcation panel is reconfigurable between a stored configuration in which at least one the one or more telecommunication elements are not accessible and a deployed configuration in which the at least one telecommunication element is accessible, and wherein the demarcation panel is configured to be selectively retained in the stored configuration using a quick connect retention element, a fastener, or both.

In accordance with another embodiment, a terminal enclosure for a telecommunications system is provided. The terminal enclosure includes a housing including a base and a cover, the housing defining an internal volume configured to receive one or more telecommunication elements therein, wherein the base and cover are pivotally coupled together at a hinged interface to selectively close the internal volume of the housing, wherein the housing comprises a lower cable opening extending through a bottom wall of the housing and configured to route telecommunication cables to and from the housing; and a skirt system disposed adjacent to the bottom wall of the housing and configured to protect the telecommunication cables extending from the housing to an underlying ground level surface.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
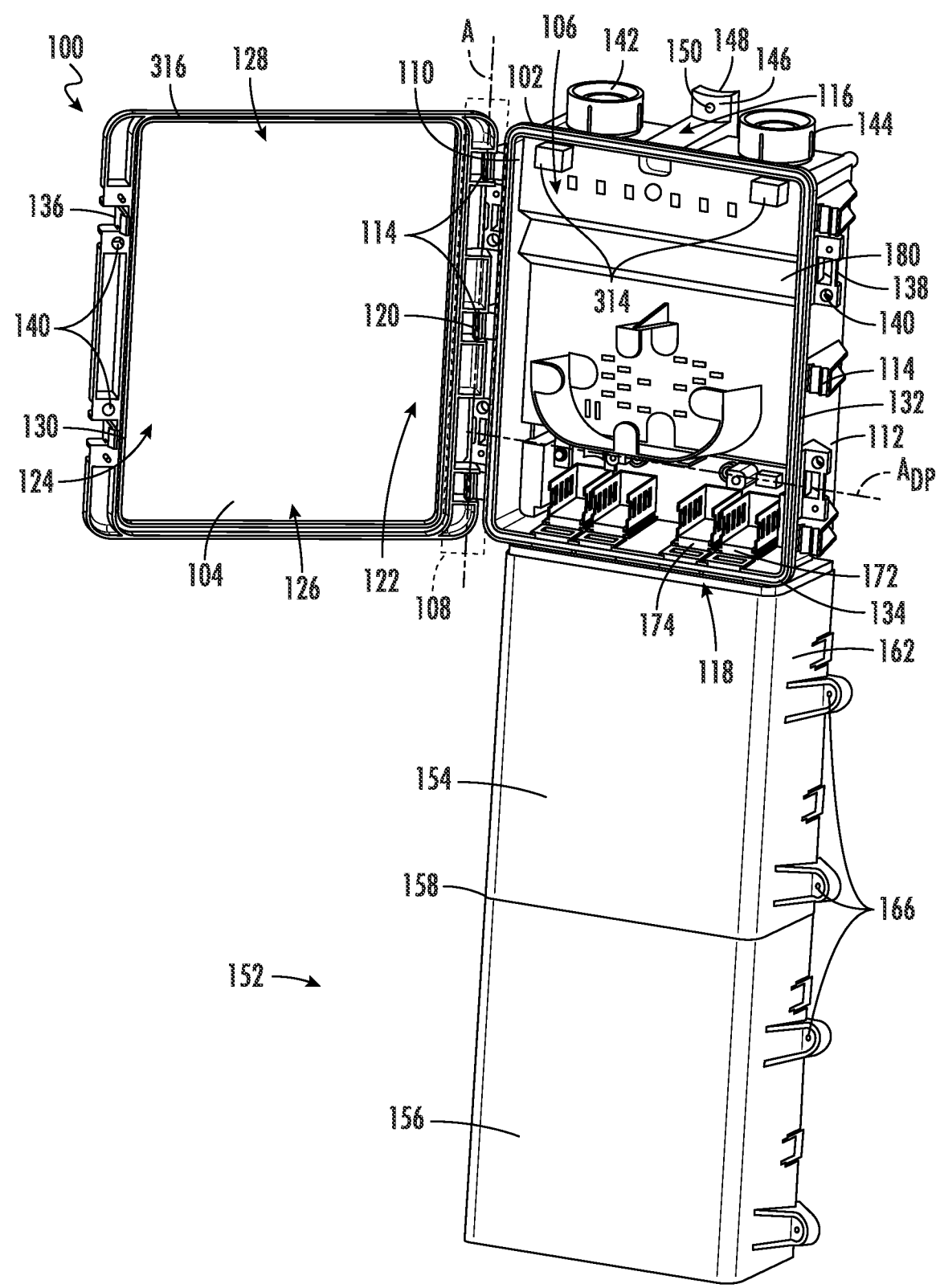
FIG. 1 is a front perspective view of an enclosure for a telecommunication system with a cover in an open position in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, terminal enclosures described herein in accordance with one or more embodiments may better accommodate the particular limitations of the installation site, better protect the cables routed to and through the enclosures, and increase operator efficiency during installation and any follow-up maintenance. For example, in an embodiment, the enclosure may include a housing defined at least in part by a base and a cover. The cover may be pivotally coupled to the base through a hinged interface. In certain instances, the cover may be reconfigurable such that the hinged interface can be disposed on a desired side of the housing. That is, the cover can be reconfigurable to accommodate, e.g., on-site spatial limitations. By way of another example, the enclosure may include a skirt system that operates with the housing to protect exposed portions of the cables routed to and from the housing. The skirt system can include a plurality of skirt elements which can be swapped and alternatively adjusted to accommodate on-site limitations. These and other advantages and inventive concepts are described below in greater detail.

Referring now to the drawings, FIG. 1 illustrates a perspective view of an enclosure 100 in accordance with an exemplary embodiment described herein. The enclosure 100 can be configured to form a termination enclosure for one or more telecommunication cables. By way of example, the telecommunication cables can include one or more optical fibers from a main trunk and one or more optical fibers from one or more subscriber lines. The enclosure 100 can form a protective enclosure for the telecommunication cables at a location where the main trunk and one or more subscriber lines are joined together.

The enclosure 100 can generally include a housing formed by a base 102 and a cover 104. The base 102 and cover 104 can together define an internal volume 106 of the enclosure 100. The cover 104 can be pivotable relative to the base 102 along a hinged interface 108. The hinged interface 108 in FIG. 1 depicts the cover 104 disposed along a left side of the housing. In another embodiment, the hinged interface 108 can be disposed along a right side of the housing. More particularly, the hinged interface 108 can be swappable between a first side 110 of the housing and a second side 112 of the housing. By way of example, the hinged interface 108 can be selected by the operator (e.g., a field technician) in view of site-specific physical limitations such as the locations of flora (e.g., plant beds, bushes, trees, and the like), special operating protocol that requires specific cover 104 placement, the particular routing configuration of the cables within (or exterior of) the housing, operator handedness (e.g., left-handed operators may prefer the cover 104 on one side of the housing while right-handed operators prefer the cover 104 on the other side of the housing), or the like. In a non-illustrated embodiment, the hinged interface 108 can be located along the top of the housing, the bottom of the housing, or both. The cover 104 can thus be repositionable to interface with the base 102 at any two or more sides of the base 102.

The base 102 can include mounting features on both the first and second sides 110 and 112 of the housing. The mounting features can include, for example, one or more hinges 114 configured to receive and operatively mate with complementary mounting features, e.g., one or more pivot points, disposed on the cover 104. In an embodiment, the mounting features on the first side 110 of the housing can be the same, or similar, to the mounting features on the second side 112 of the housing. That is, for instance, the mounting features on the first side 110 and second side 112 can share a common feature type, shape, size, or any combination thereof. In a further embodiment, the mounting features on the first side 110 and the second side 112 can share a common layout. That is, for instance, the mounting features on the first side 110 can share a layout with the mounting features on the second side 112. In a particular embodiment, the mounting features on the first side 110 can be reflectively symmetrical with the mounting features on the second side 112 about a plane extending between a top side 116 and a bottom side 118 of the base 102.

As described above, the cover 104 can include complementary mounting features configured to engage with the mounting features of the base 102 to permit selective attachment therebetween. In the illustrated embodiment, the complementary mounting features can include one or more pins 120 that operatively engage with the one or more hinges 114 of the base 102. The pins 120 can be sized, shaped, spatially located, and the like in view of the one or more hinges 114. In an embodiment, the pins 120 can be interchangeably utilized with the hinges 114 on the first side 110 of the housing and the hinges 114 on the second side 112 of the housing to permit reconfiguration of the cover 104 between a left-side mounting configuration and a right-side mounting configuration.

In an embodiment, the cover 104 can have a first orientation when utilizing the left-side mounting configuration (as depicted in FIG. 1) and a second orientation when utilizing the right-side mounting configuration (not shown). The first and second orientations may be angularly offset from one another. For instance, the first and second rotational orientations can be approximately 180 degrees offset from one another. That is, the cover 104 may be reconfigurable between the left-side mounting configuration and the right-side mounting configuration by rotating the cover 104. In this regard, an inner side 122 of the cover 104 and an outer side 124 of the cover remain inner and outer sides, respectively, regardless of left- and right-side mounting configurations while vertical sides 126 and 128 of the cover 104 vary based on the mounting configuration.

The cover 104 can be displaced relative to the base 102 along a range of angles, $\alpha$, as measured relative to the base 102 along a rotational axis A formed by the hinged interface 108. In an embodiment, the range of angles, $\alpha$, can be in a range of 450 and 270°, such as in a range of 900 and 225°, such as in a range of 1350 and 200°. In certain instances, the cover 104 may be limited in rotational displacement by the first side 110 of the housing. That is, a pivotable stop between the cover 104 and base 102 can occur as the cover 104 comes into contact with the first side 110 of the housing. In another instance, the cover 104 may be limited in rotational displacement by the mounting features. For instance, at least one of the pin 120 and hinge 114 can have a stop feature which prevents the mounting features from rotational displacement after a certain amount.

The cover 104 may be removable from the base 102. In a more particular embodiment, the cover 104 and base 102 may include a quick connect/disconnect interface configured to permit rapid attachment or removal of the cover 104 from the base 102. In a particular embodiment, the cover 104 may be removable from the base 102 when the cover 104 is in a range of angular positions, $\beta$, as measured along the rotational axis A. In an embodiment, $\beta$ can at least partially overlap $\alpha$. That is, $\beta$ can occur over at least a portion of the maximum rotational displacement of the cover 104. In a further embodiment, $\beta$ can be less than $\alpha$. For example, $\beta$ can be at least 1° less than $\alpha$, such as at least 5° less than $\alpha$, such as at least 15° less than $\alpha$, such as at least 30° less than $\alpha$, such as at least 45° less than $\alpha$, such as at least 60° less than $\alpha$, such as at least 90° less than $\alpha$, such as at least 1° less than $\alpha$, such as at least 120° less than $\alpha$, such as at least 150° less than $\alpha$, such as at least 180° less than $\alpha$. In this regard, the cover 104 may be connected/disconnected relative to the base 102 within a range of angular displacements less than a maximum displacement of the cover 104 with respect to the base 102. In a particular embodiment, p can include an angular range less than 90°, such as less than 45°, such as less than 30°, such as less than 15°. In an embodiment, $\beta$ can be approximately 0°. In this embodiment, the cover 104 can be configured to be removed from the base 102 at a relatively fixed angular displacement therebetween. By way of example, connecting or disconnecting the cover 104 relative to the base 102 can occur when a best fit plane of the cover 104 is approximately orthogonal to a best fit plane of the base 102. In this configuration, the cover 104 can be connected or disconnected relative to the base 102 by moving the cover 104 in a direction generally parallel with the best fit plane of the cover 104. More particularly, the cover 104 can be connected or disconnected relative to the base 102 by moving the cover 104 in a direction generally towards or away from the base 102, respectively. The hinged interface 108 can create an indication when the cover 104 is coupled to the base 102. The indication can include, for example, a tactile indication, an audible indication, a visual indication, or any combination thereof.

The cover 104 can define a sealing channel 130 configured to interact with a sealing channel 132 of the base 102, and a sealing element 134. The sealing channels 130 and 132 can include, for instance, grooves extending into the bodies of the cover 104 and baes 102 that permit the sealing element 134 to seat therebetween when the housing is closed. In an embodiment, the sealing element 134 can remain fixed to the base 102 and selectively interact with the cover 104 when the housing is closed. In another embodiment, the sealing element 134 can remain fixed to the cover 104 and selectively interact with the base 102 when the housing is closed. In yet another embodiment, the sealing element 134 can float relative to the base 102 and the cover 104. In this regard, the sealing element 134 may not be fixed to either the base 102 or the cover 104. The sealing element 134 can form a bead that extends around a perimeter of the internal volume 106. The bead can have a suitable cross-sectional shape to form a sealing interface between the base 102 and housing 104. In a non-limiting embodiment, the bead can have a generally O-shaped cross section. In certain instances, the bead can have a uniform shape, size, or both. In other instances, the bead can have a variable shape, size, or both. In an embodiment, the bead can be a ring configured to extend continuously around the perimeter of the internal volume 106. In another embodiment, the bead can be a split ring having a break between circumferentially extending ends of the bead. In yet another embodiment, the bead can include two or more beads that operate together to seal the internal volume 106. The sealing element 134 can be configured to seal the internal volume 106 with the cover 104 in either the left-side mounting configuration or the right-side mounting configuration. Accordingly, the channels 130 and 132 can be symmetrical with one another, such as rotationally symmetrical about a center of the housing.

In an embodiment, the enclosure 100 can include a double-walled configuration, including a redundant wall 316 extending adjacent to the sealing channel 130. The redundant wall 316 can extend around the perimeter of at least one of the base 102 or cover 104. In an embodiment, the redundant wall 316 can extend continuously around the perimeter. The redundant wall 316 can assist in preventing ingress of dirt, debris, and water into the enclosure 100.

After attaching the cover 104 and base 102 together, the cover 104 can be pivotally rotated relative to the base 102 between an open position and a closed position. In the open position, the technician can access the internal volume 106. In the closed position, the internal volume 106 is inaccessible and the housing is sealed. One or more complementary retention features can be used to maintain the cover 104 in the closed position. The complementary retention features can be selectively engaged with one another to secure the cover 104 in the closed position. The complementary retention features can include, for example, a clip 136 and a receiver 138 configured to receive and secure the clip 136 relative therewith. By way of non-limiting example, the clip 136 can include a projection which is engageable with the receiver 138. In certain instances, the clip 136 can automatically couple relative to the receiver 138 upon reaching a critical engagement therewith. In other instances, the clip 136 can be user actuatable between a coupled and uncoupled configuration relative to the receiver 138. That is, the technician can selectively move the clip 136 into coupled engagement with the receiver 138 upon reaching a critical engagement position therebetween. The technician can remove the clip 136 from the receiver 138 by operating on the clip 136, the receiver 138, another component (not shown), or any combination thereof. Once the clip 136 and receiver 138 are no longer coupled together, the technician can open the cover 104 to permit access to the internal volume 106. While the illustrated embodiment, shows the clip 136 disposed on the cover 104 and the receiver 138 disposed on the base 102, in another embodiment, the clip 136 can be disposed on the base 102 and the receiver 138 can be disposed on the cover 104. Alternatively, other engagement features can be utilized to couple the base 102 and cover 104 together relative to one another.

In an embodiment, the complementary retention features can include a plurality of complementary retention features. For instance, as illustrated in FIG. 1, the base 102 includes two receiver 138 and the cover includes two clips 136. Each receiver/clip pair can define a discrete complementary retention feature. In other embodiments, the enclosure 100 can include any other number of complementary retention features, such as one complementary retention feature, three complementary retention features, four complementary retention features, five complementary retention features, and the like. Similar to the aforementioned hinges 114 and pins 120, in one or more embodiments the complementary retention feature(s) can be symmetrically disposed on the first side 110 and second side 112 of the housing. In this regard, the cover 104 can be closed when using left-side mounting protocol and right-side mounting protocol. In another embodiment, the complementary retention feature(s) can be asymmetrically disposed on the first and second sides 110 and 112 of the housing. For instance, the complementary retention feature(s) on the first side 110 can be disposed in a first arrangement and the complementary retention feature(s) on the second side 112 can be disposed in a second arrangement different than the first arrangement.

The complementary retention features can define a multi-protocol attachment between the cover 104 and the base 102. For instance, as described above, at least one of the complementary retention features can include a clip 136 and a receiver 108. The clip 136 and receiver 138 can define a quick connect interface configured to permit quick closure of the housing. The complementary retention features can further include a secondary connection interface configured to form a secondary connection between the cover 104 and base 102, at least in the closed position. By way of example, the secondary connection interface can include a locked interface, a tamper-proof/resistant interface, or another resilient interface configured to be engaged after the technician is finished operating on the cables and the enclosure 100. In the illustrated embodiment, the secondary connection interface of the complementary retention feature includes an aperture 140 extending through both the cover 104 and the base 102. The aperture 140 can be aligned when the cover 104 and base 102 are in the closed position. With the aperture 140 aligned, the technician can install a lock, tamper-proof/resistant element, or the like. Tamper-proof-resistant elements may include ties such as zip ties or heavy wire, indicators to allow for inspection of tampering, technician-certified rings or labels inserted through the aperture 140 to show evidence of tampering, and the like.

A conduit system can be disposed along the top side 116 of the housing. The conduit system can permit cables of the telecommunication system to exit the housing at the top side 116 thereof. In an embodiment, the conduit system can include a plurality of conduits, including for example, a first conduit 142 and a second conduit 144. In an embodiment, the first and second conduits 142 and 144 can share a same size, shape, or both. In another embodiment, the first and second conduits 142 and 144 can be different from one another. For instance, by way of non-limiting example, the first conduit 142 can define a first opening size different from a second opening size of the second conduit 144. Differences between the first and second conduits 142 and 144 may allow the technician to perform installation of the enclosure 100 over a wider range of cable specifications. That is, enclosure 100 may be usable in a wider range of operations. For instance, some cable systems may define cable bodies having large cross-sectional shapes which require a larger conduit while other cable systems utilize smaller cable bodies. The appropriate conduit can be selected based on the cable body shape or size. Differences between the first and second conduits 142 and 144 may be advantageous when enclosures 100 are stacked together (as described in greater detail hereinafter).

In an embodiment, the enclosure 100 can further include a mounting system configured to mount the enclosure 100 to a surface of the environment in which the enclosure 100 is being used. The mounting system can include, for example, a mounting bracket 146 configured to be engaged with the surface of the environment. The mounting bracket 146 can extend from the top side 116 of the housing. In an embodiment, the mounting bracket 146 can be centrally located between the first and second sides 110 and 112 of the housing. The mounting bracket 146 can be configured to be coupled to a pole, e.g., a telephone pole, using a strap (not shown). The strap can extend around the pole and the mounting bracket 146 to tie the enclosure 100 to the pole. In another embodiment, a rope, cable, tie down, or other structure can be used to tie the enclosure 100 to the pole. A flanged end 148 of the mounting bracket 146 can prevent the strap from slipping relative to the pole. In another embodiment, the mounting bracket 146 can be coupled to the surface of the environment using a fastener, such as a threaded or non-threaded fastener. The fastener can be coupled to the mounting bracket 146 through a fastener interface 150, such as an opening configured to receive and secure the fastener to the housing. In an embodiment, the fastener interface 150 can include an oversized, e.g., elongated, opening into which the fastener can be received. The oversized opening can permit spatial adjustment of the enclosure 100 relative to the surface of attachment. For instance, in an embodiment the elongated opening can extend vertically. The fastener can move within (relative to) the vertically extending elongated opening to allow the operator to adjust the height of the enclosure 100 after the fastener is engaged with the elongated opening.

While not depicted in FIG. 1, the enclosure 100 can further include a second mounting bracket configured to operate with the aforementioned mounting bracket 146. In an embodiment, the second mounting bracket can be disposed along the bottom side 118 of the enclosure. The second mounting bracket can alternatively be disposed on any one or more of the other sides of the enclosure. The second mounting bracket can include similar shape, size, features, or any combination thereof as compared to the mounting bracket 146. In an embodiment, the second mounting bracket can include an oversized, e.g., elongated, opening into which a fastener can be received. The oversized opening can permit adjustment of the enclosure 100 relative to the surface of attachment. For instance, in an embodiment, the elongated opening of the second mounting bracket can extend horizontally. The fastener can then move within (relative to) the horizontally extending elongated opening to allow the operator to adjust the rotational position of the enclosure 100 after the fastener is engaged with the elongated opening. In concert with the mounting bracket 146, the elongated openings can permit the operator to adjust (e.g., fine-tune) position of the enclosure 100 relative to the underlying surface after installing (or partially installing) the fasteners holding the enclosure to the underlying surface.

In certain instances, the technician can utilize different protocols at each of the mounting brackets for mounting the enclosure to the underlying surface. For example, the mounting bracket 146 extending from the top side 116 can be coupled to the underlying surface using a fastener while the mounting bracket 146 extending from another side of the enclosure 100 can be coupled to the underlying surface using a strap.

In certain instances, the enclosure 100 can be utilized with a skirt system 152 to protect cables routed to and from the internal volume 106. The skirt system 152 can extend from the enclosure 100 and cover the cables along any vulnerable portion between the enclosure 100 and a protective element (e.g., piping, an outer cable, or the like) or the underlying ground surface. The skirt system 152 may protect the cables against impact from yard tools such as mowers and trimmers, damage from animals such as dogs and mice, weather degradation, and the like. In certain instances, the skirt system 152 can form a weather-resistant protective layer around the cables. The skirt system 152 can extend from the bottom side 118 of the enclosure 100. In a more particular embodiment, a sealing interface can be disposed between the bottom side 118 of the enclosure 100 and the skirt system 152. In another embodiment, the skirt system 152 can be recessed under the enclosure 100 such that no portion of the skirt system 152 extends past the cover 104. In this regard, the skirt system 152 can be protected against weather (e.g., rain and overhead runoff) by the enclosure 100. In an embodiment, the cover 104, in the closed position, can contact, bias, or otherwise affect the skirt system 152 so as to further prevent ingress of contaminants into the enclosure 100.

Figure 2:
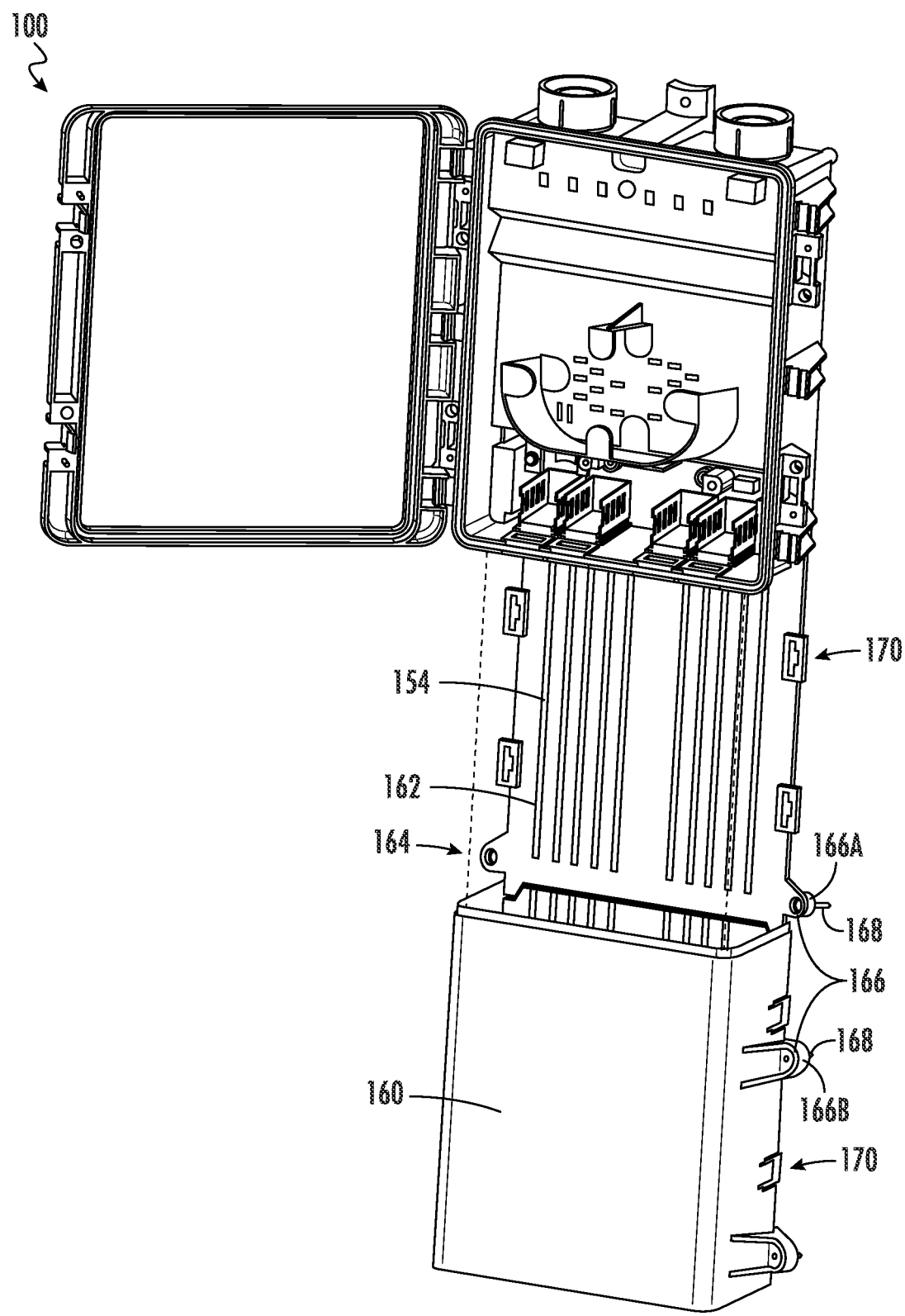
FIG. 2 is a front perspective view of the enclosure with a portion of a skirt system of the enclosure removed in accordance with embodiments of the present disclosure.

In an embodiment, the skirt system 152 can include a plurality of skirts, such as a first skirt 154 and a second skirt 156. The plurality of skirts can be arranged in a line, e.g., a column, to form a protected covering for the cables. In the illustrated embodiment, the first skirt 154 and second skirt 156 abut one another at an interface 158. In an embodiment, the interface 158 can be a sealed interface. The sealed interface can be formed, for example, through a compression or shaped fitting. Referring to FIG. 2, the sealed interface 158 can include an overhang portion on a lower end of the upper skirt which overhangs the lower skirt so as to prevent ingress of dripping or running water. In another embodiment, the interface 158 can include an intermediary element such as a seal disposed between the first skirt 154 and the second skirt 156.

FIG. 2 illustrates an embodiment of the enclosure 100 with a first panel 160 (FIG. 1) of the first skirt 154 omitted. A second panel 162 is depicted and can be coupled to the first panel 160. In the illustrated embodiment, the second panel 162 defines an inner panel member (i.e., a panel disposed closer to the underlying surface) and the first panel 160 defines an outer panel (i.e., a panel disposed further from the underlying structure). The first and second panels 160 and 162 can together define a skirt protection volume 164 through which the cables can extend.

In certain instances, the skirt system 152 can be coupled to an underlying surface (e.g., a wall, fence, post, or the like) through a skirt attachment protocol 166. By way of example, the skirt attachment protocol 166 can include a fastener system, a hook and loop system (e.g., Velcro), adhesive or adhesive strips, or other similar attachment protocol.

In the illustrated embodiment, the skirt attachment protocol 166 uses a fastener system including fasteners 168. In an embodiment, the fastener system can include at least two alternative fastening positions. For instance, a first skirt attachment protocol 166A is depicted with the fastener 168 coupling the second panel 162 of the first skirt 154 to the underlying surface and a second skirt attachment protocol 166B is depicted with the fastener 168 coupling the first panel 160 of the second skirt 156 to the underlying surface. In certain instances, the holes of the first and second panels 160 and 62 into which the fasteners 168 are disposed can be in coaxial alignment with one another when the first skirt 154 is engaged with the second skirt 156. In a particular instance, when utilizing the second skirt attachment protocol 166B, the fastener 168 can extend through the holes of both the first and second panels 160 and 162. In another instance, the first panel 160 can be utilized without the second panel 162 by attaching the first panel 160 directly to the underlying surface.

The first and second panels 160 and 162 of the skirts can be coupled together through an intra-skirt attachment 170. In the illustrated embodiment, the intra-skirt attachment 170 is a snap fit attachment. Other intra-skirt attachment options include threaded fasteners, non-threaded fasteners, detachable clips, zip-ties, cables, threads, bayonet connections, adhesive, adhesive strips, and the like.

In an embodiment, the skirt system 152 can utilize fungible skirts. That is, the first and second skirts 154 and 56 can be interchangeable with one another. In a more particular embodiment, the first panels 160 may all be interchangeable with one another. In another more particular embodiment, the second panels 162 may all be interchangeable with one another. In this regard, any first panel 160 can be used with any second panel 162.

Referring again to FIG. 1, the enclosure 100 can further include a grommet system along the bottom side 118 of the housing. The grommet system can permit cables of the telecommunication system to exit the housing at the bottom side 118 thereof. In an embodiment, the grommet system can include a plurality of grommet, such as at least two grommet, such as at least three grommet, such as at least four grommet, and the like. The grommet system can include for example, a first grommet 172, a second grommet 174, a third grommet 176, and a fourth grommet 178. In an embodiment, any one or more of the first, second, third, or fourth grommets 172, 174, 176, or 178 can share a same size, shape or both. In another embodiment, any one or more of the first, second, third, or fourth grommets 172, 174, 176, or 178 can be different from one another. Differences between the first, second, third, or fourth grommets 172, 174, 176, or 178 may allow the technician to perform installation of the enclosure 100 over a wider range of cable specifications. That is, the enclosure 100 may be usable in a wider range of operations. For instance, some cable systems may define cable bodies having large cross-sectional shapes which require a larger grommet while other cable systems utilize smaller cable bodies. The appropriate grommet can be selected based on the cable body shape or size. Differences between the first, second, third, or fourth grommets 172, 174, 176, or 178 may be advantageous when enclosures 100 are stacked together (as described in greater detail hereinafter). In use, cables can pass through the grommet system and the skirt protection volume 164.

In an embodiment, the grommet system is disposed internal to the sealing element 134. That is, the sealing element 134 is disposed between the grommet system and the cover 104 when the cover 104 is in the closed position. In another embodiment, the grommet system can be external to the sealing element 134.

Referring still to FIG. 1, the enclosure 100 can further include a demarcation panel 180 that operatively moves between an open position and a closed position. The demarcation panel 180 is depicted in FIG. 1 in the closed position and FIG. 5 in the open position. The demarcation panel 180 may be pivotable about a pivot axis $A_{DP}$. In an embodiment, the pivot axis $A_{DP}$ can be orthogonal, or generally orthogonal, to the axis A of the hinged interface 108. In a particular embodiment, the pivot axis $A_{DP}$ can be configured to lie along a horizontal, or generally horizontal, plane. The pivot axis $A_{DP}$ can be disposed at any relative height of the enclosure 100, such as at a location adjacent to the top of the enclosure 100, at a location adjacent to the bottom of the enclosure 100, or at a location therebetween. In another embodiment, the pivot axis $A_{DP}$ can lie along a vertical, or generally vertical, plane. The pivot axis $A_{DP}$ can be disposed at, or adjacent to, the first side 110, at, or adjacent to, the second side 112, at a location between the first and second sides 110 and 112, or the like.

In an embodiment, the demarcation panel 180 can include one or more grippable portions 314 that permit the technician to easily grip the demarcation panel 180 and rotate it between the closed and open positions. In the illustrated embodiment, the grippable portions 314 are disposed along an end of the demarcation panel 180 opposite the pivot axis $A_{DP}$, such as along an upper end of the demarcation panel. The grippable portions 314 can include cutouts, overhangs, handles, or the like which permit the technician to grip the demarcation panel 180 during installation. In an embodiment, the grippable portions 314 can have rounded edges to allow for a more comfortable experience when the technician extends fingers into the grippable portions 314.

Figure 3:
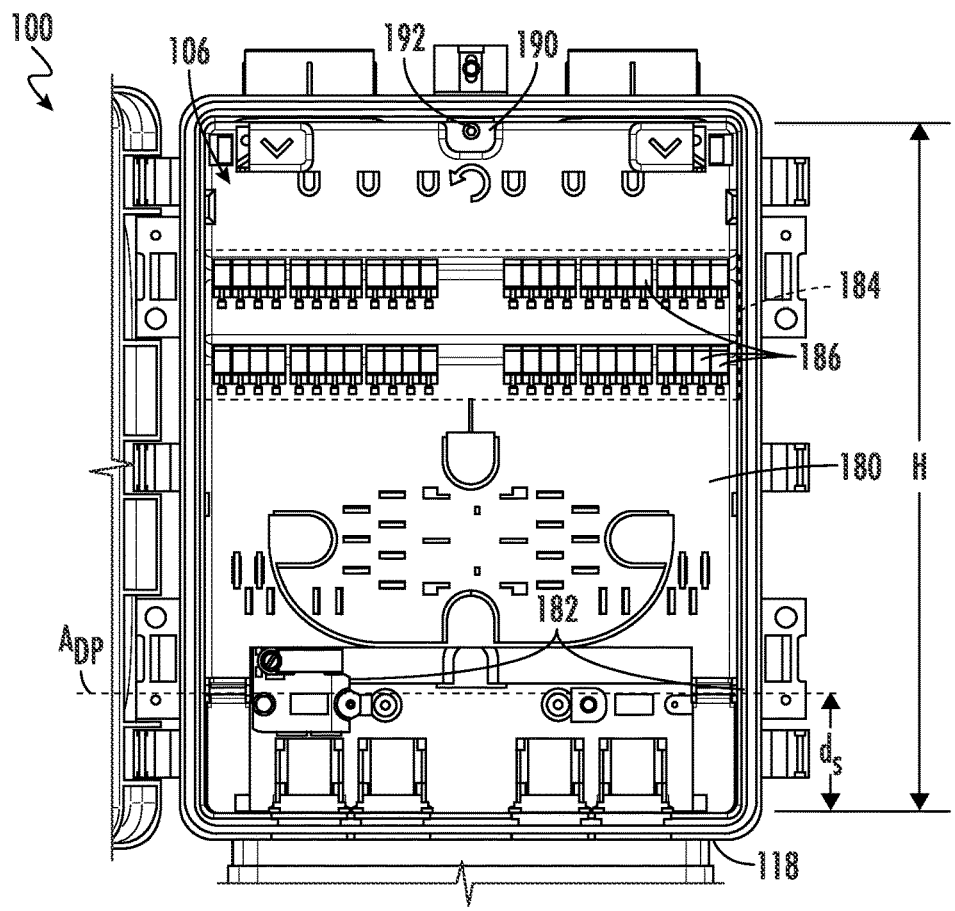
FIG. 3 is a front view of the enclosure in accordance with embodiments of the present disclosure.

FIG. 3 depicts a front view of the enclosure 100 including the demarcation panel 180 shown in a stored position. The demarcation panel 180 can be coupled to the base 102 at one or more demarcation panel coupling points 182. In an embodiment, the demarcation panel coupling points 182 can be quick detach couplings. For instance, similar to the cover 104, the demarcation panel 180 can be detached from the demarcation panel coupling points 182 without undoing fasteners or other retention members by moving the demarcation panel 180 in a direction away from the base 102. The demarcation coupling points 182 can be configured to support the demarcation cover 180 along the pivot axis $A_{DP}$. In an embodiment, the pivot axis $A_{DP}$ can be spaced apart from the bottom side 118 of the housing by a distance, $d_S$, that is at least 1% of a height, H, of the internal volume 106, such as at least 2% of H, such as at least 5% of H, such as at least 10% of H, such as at least 15% of H, such as at least 20% of H. In this regard, the demarcation panel 180 can occupy less than 100% of the area of the enclosure 100, such as less than 90% of the area of the enclosure 100, such as less than 80% of the area of the enclosure 100, such as less than 75% of the area of the enclosure 100.

In an embodiment, the demarcation panel 180 can be coupled to the housing of the enclosure 100 through an intermediate member 183 (FIG. 5) disposed within the enclosure 100. In a particular embodiment, the intermediate member 183 can define a shape similar to the shape of at least a portion of the enclosure 100. That is, for instance, the intermediate member 183 can have portions which form a close fit with the enclosure 100. The intermediate member 183 can define one or more of the features described herein. For instance, as described below with respect to FIGS. 7 through 9, the intermediate member 183 can define hinges for pivotally receiving one or more trays or other telecommunication component(s).

Referring again to FIG. 3, the demarcation panel 180 can define a connector interface region 184 configured to receive one or more connectors 186. In an embodiment, the connector interface region 184 can be configured to receive at least two connectors, such as at least three connectors, such as at least four connectors, such as at least five connectors, such as at least ten connectors, such as at least twenty connectors, such as at least forty connectors. In an embodiment, the connectors 186 can all be the same type of connectors. In another embodiment, at least one of the connectors 186 can be different from the others. The connectors 186 can include single mode connectors or multimode connectors. The connectors 186 can include, for example, LC, SC, or ST type connectors. The list of connector types is exemplary only. Other connector types can be used as connectors 186 without deviating from the scope of the disclosure. Connector packs can be used which include a plurality of connectors coupled together. For instance, the connector packs can include 1×n connectors, where n is the number of connectors in the pack.

Figure 4:
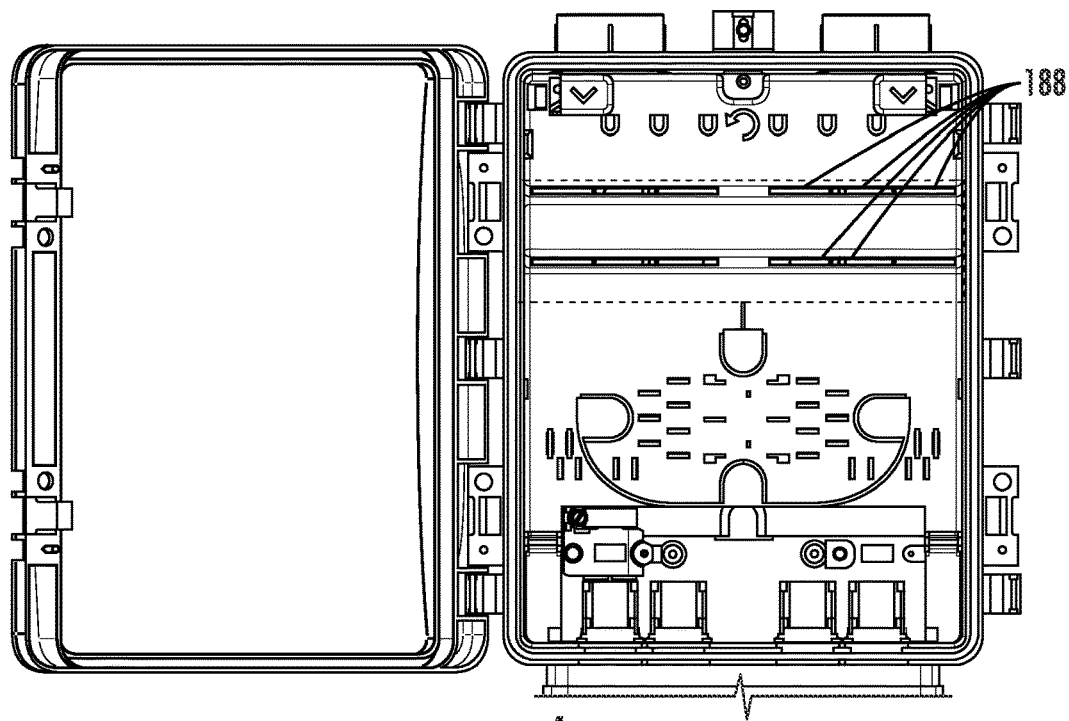
FIG. 4 is a front view of another enclosure in accordance with embodiments of the present disclosure.

The one or more connectors 186 can pass through the demarcation panel 180 within the connector interface region 184 through one or more openings 188 therein (FIG. 4). The openings 188 can be arranged in a plurality of rows across the demarcation panel 180. In the exemplary embodiment depicted, the openings 188 are arranged in two rows extending across a majority of the demarcation panel 180. In other embodiments, the openings 188 can define at least three rows, such as at least four rows, such as at least five rows.

Figure 5:
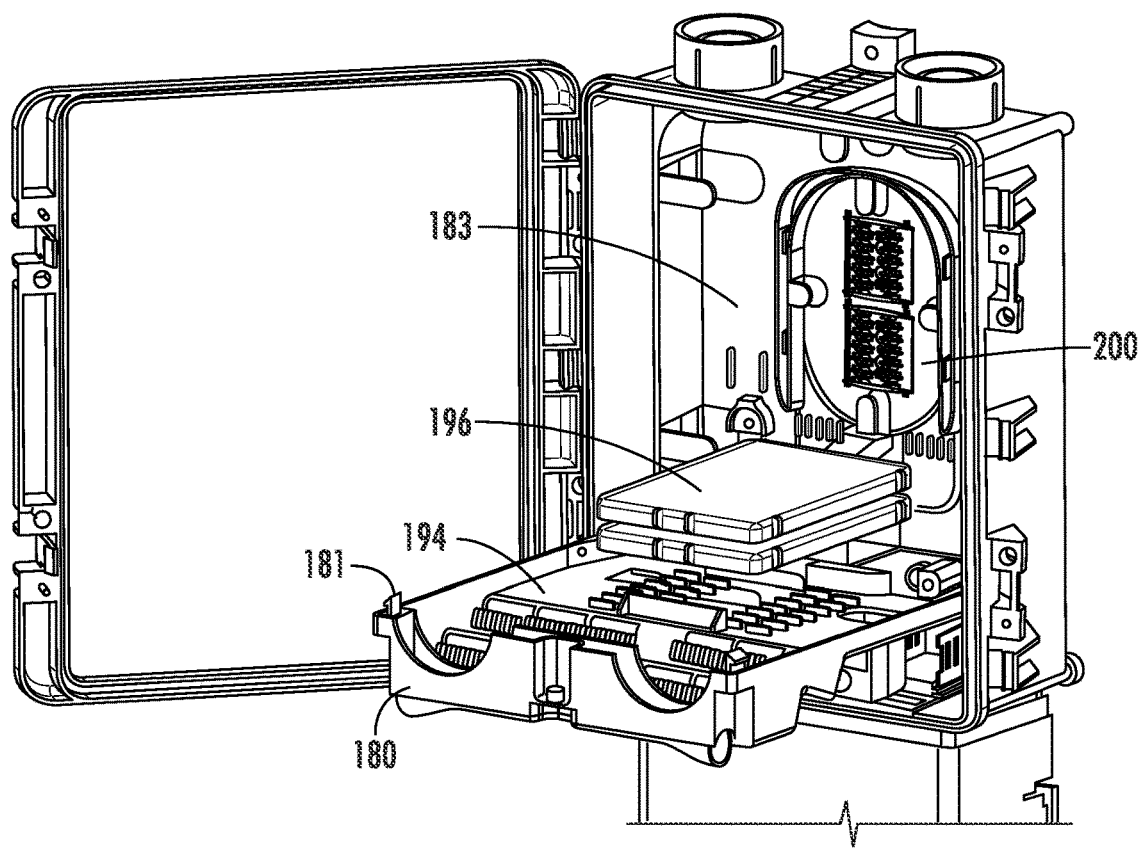
FIG. 5 is a front perspective view of an enclosure having a demarcation panel and trays depicted in an open position in accordance with embodiments of the present disclosure.

As previously described, the demarcation panel 180 can be rotatable between an open position (FIG. 5) and a closed position (FIGS. 1-4) about the pivot axis $A_{DP}$. The demarcation panel 180 can be coupled in the closed position using one or more connection elements. In an embodiment, the one or more connection elements can include a quick connect retention element 190 and a secondary retention element 192 that is different from the quick connect retention element 190. The quick connect retention element 190 can be configured to form a quick connect interface to keep the demarcation panel 180 in the closed position. By way of example, in an embodiment, the quick connect retention element 190 can include a magnetic interface. The magnetic interface can include a first magnet (not shown) disposed on the demarcation panel 180 and a second magnet (not shown) disposed along an underlying surface of the enclosure 100 and disposed in a position so as to interact with the first magnet. In another embodiment, the quick connect retention element 190 can include a clip, e.g., a retention clip 181 (FIG. 5), which can releasably secure the demarcation panel 180 in the closed position. By way of non-limiting example, the retention clip 181 can be part of the demarcation panel 180 and interface with an underlying feature disposed behind the demarcation panel 180, e.g., along the housing, such as along the back side 200 (FIG. 5). The retention clip 181 can snap into the underlying feature to quickly retain the demarcation panel 180 in the closed position. In certain instances, decoupling the quick connect retention element 190 can include releasing the retention clip 181 by biasing the retention clip 181, an adjoining area, or otherwise operating on another part of the quick connect retention element 190. In other instances, decoupling the quick connect retention element 190 can be performed by biasing the demarcation panel 180 with sufficient force so as to overcome retention.

In certain instances, the secondary retention element 192 can define a more permanent attachment protocol as compared to the quick connect retention element 190. By way of non-limiting example, the secondary retention element 192 can include a fastener, e.g., a threaded or non-threaded fastener, which can be selectively used to couple the demarcation panel 180 to the underlying surface of the enclosure 100. Use of a multi-fastening demarcation panel 180 may allow the installation technician to quickly move the demarcation panel 180 between the open and closed positions during installation and servicing operations using the quick connect retention element 180. When finished with installation and servicing operations, the technician can utilize the secondary retention element 192 to more permanently hold the demarcation panel 180 in the closed position. This may be particularly advantageous so as to prevent later technicians from accidently moving the demarcation panel 180 to the open position when connecting fiber optic cables to the front of connectors 186.

FIG. 5 illustrates an embodiment of the enclosure 100 with the demarcation panel 180 in the open position. In an embodiment, the demarcation panel 180 can rotate at least 45° between the open and closed positions, such as at least 60° between the open and closed positions, such as at least 900 between the open and closed positions. In certain instances, the demarcation coupling points 182 (or another related feature of the enclosure) can include a rotational stop to delimit a rotationally open-most position for the demarcation panel 180. In this regard, the demarcation panel 180 can be supported in the open position along a generally horizontal plane.

As previously described the demarcation panel 180 can be removable from the demarcation coupling points 182. In certain instances, removal of the demarcation panel 180 from the demarcation coupling points 182 can only be performed along a portion of the rotational displacement of the demarcation panel 180 between the open and closed positions. For instance, in an embodiment, the demarcation panel 180 is removable along less than 75% of the rotational displacement of the demarcation panel 180 between the open and closed positions, such as along less than 50% of the rotational displacement of the demarcation panel 180 between the open and closed positions, such as along less than 25% of the rotational displacement of the demarcation panel 180 between the open and closed positions, such as less than 10% of the rotational displacement of the demarcation panel 180 between the open and closed positions, such as less than 5% of the rotational displacement of the demarcation panel 180 between the open and closed positions. In a particular embodiment, the demarcation panel 180 can be removable from the demarcation panel coupling points 182 only in the closed, or generally closed, position. In such a manner, the demarcation panel 180 can remain coupled to the demarcation panel coupling points 182 when the demarcation panel 180 is in the open position.

A back surface 194 of the demarcation panel 180 can be used by the technician when the demarcation panel 180 is in the open position. For instance, the technician may utilize the back surface 194 of the demarcation panel 180 for laying down, organizing, arranging, or preparing optical fibers or other telecommunication elements to be installed in the enclosure 100. By way of non-limiting example, the telecommunication elements can include one or more of splitters, splitter modules, splice trays, filters, adapters, adapter packs, sensors or other measurement equipment, and the like.

The demarcation panel 180 can generally separate the enclosure 100 into a plurality of volumes, including, e.g., front and rear volumes. By way of example, the rear volume may be used by an initial installation technician to install a trunk cable within the enclosure 100 and set up one or more connectors 186 which can pass through the demarcation panel 180. After installation of the trunk cable and setting up the one or more connectors 186, the demarcation panel 180 can be closed. In this regard, access to the trunk cable and back sides of the one or more connectors 186 can be securely protected behind the demarcation panel 180. At the same time as the technician sets up the trunk cable and one or more connectors 186, or at a later time, the technician (or another technician) may access signals from the trunk like by plugging into the front of the one or more connectors 186. Use of the quick connect retention element 190 can allow the initial installation technician to temporarily secure the demarcation panel 180 in the closed position. After the initial installation is completed, the secondary retention element 192 can be used to more permanently secure the demarcation panel 180 in the closed position.

The enclosure 100 can include one or more trays 196 disposed behind the back surface 194 of the demarcation panel 180. The trays 196 can include a plurality of trays 196, such as at least two trays 196, such as at least three trays 196, such as at least four trays 196, such as at least five trays 196. The trays 196 can be pivotally mounted to the enclosure 100 to permit an operator to more easily access the trays 196. In an embodiment, the trays 196 can be individually accessible. That is, for instance, the trays 196 can each be individually accessed by rotating the individual tray from a closed position (as shown, e.g., in FIG. 6) to an open position (FIG. 5).

A splice management area 198 can be disposed behind the trays 196. In an embodiment, the splice management area 198 can be disposed along a back side 200 of the housing. The splice management area 198 can define a space configured to receive one or more cables routed through the enclosure 100. In an embodiment, the splice management area 198 can secure one or more splices between two or more cables to the enclosure 100. In an embodiment, the splice management area 198 can include a plurality of splice modules or splitter modules. In an embodiment, the plurality of splice modules or splitter modules can share the same, or similar, shapes, sizes, orientations, or any combination thereof. In another embodiment, at least one of the plurality of splice modules or splitter modules can have a different shape, size, orientation, or any combination thereof as compared to another one of the plurality of splice modules or splitter modules.

Figure 6:
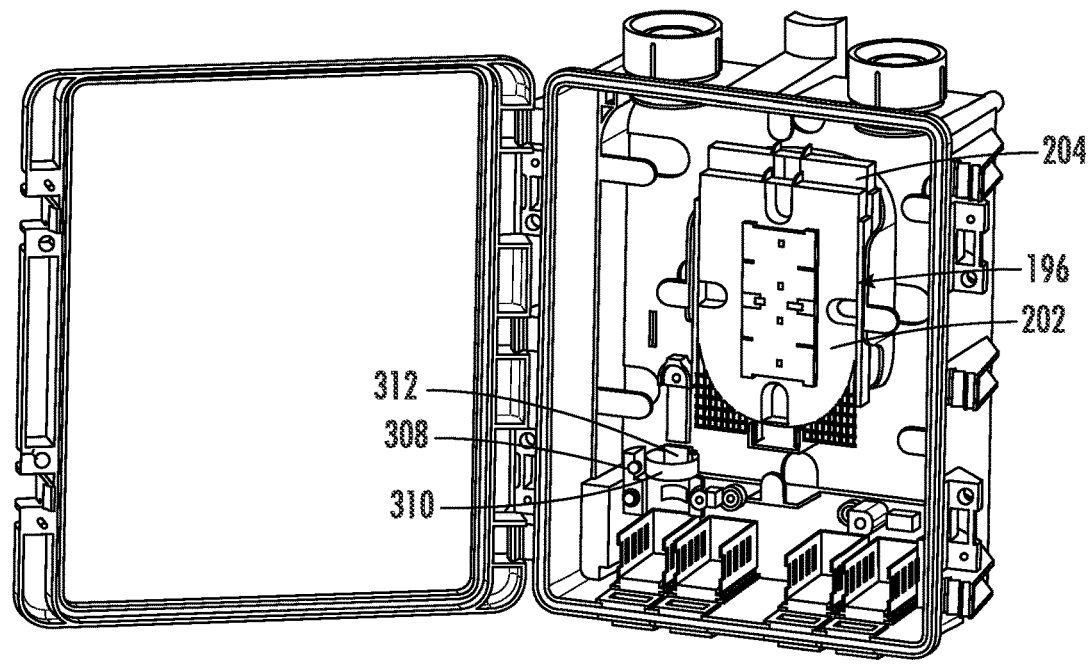
FIG. 6 is a front perspective view of the enclosure having the demarcation panel removed and trays in a closed position in accordance with embodiments of the present disclosure.

FIG. 6 illustrates the enclosure 100 with the demarcation panel 180 removed. The trays 196 are depicted in FIG. 6 in the closed position. As shown, in an embodiment, the trays 196 can be vertically offset from one another. That is, for instance, a first tray 202 can be disposed at a first vertical elevation and a second tray 204 can be disposed at a second vertical elevation different from the first vertical elevation. In the illustrated embodiment, the second tray 204, which is disposed behind the first tray 202, is disposed at a higher vertical elevation than the second tray 204. In such a manner, the first and second trays 202 and 204 can be rotated to the open positions without requiring a complex hinging mechanism.

Figure 7:
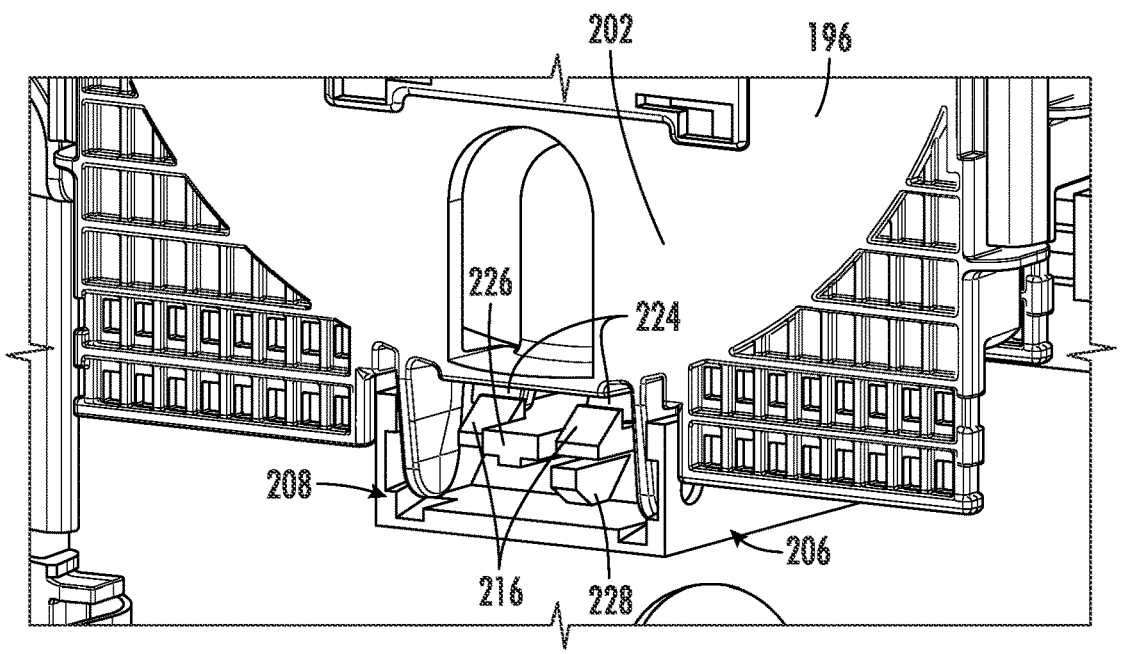
FIG. 7 is a front perspective view of a hinge mechanism for trays to be positioned in the enclosure in accordance with embodiments of the present disclosure.
Figure 8:
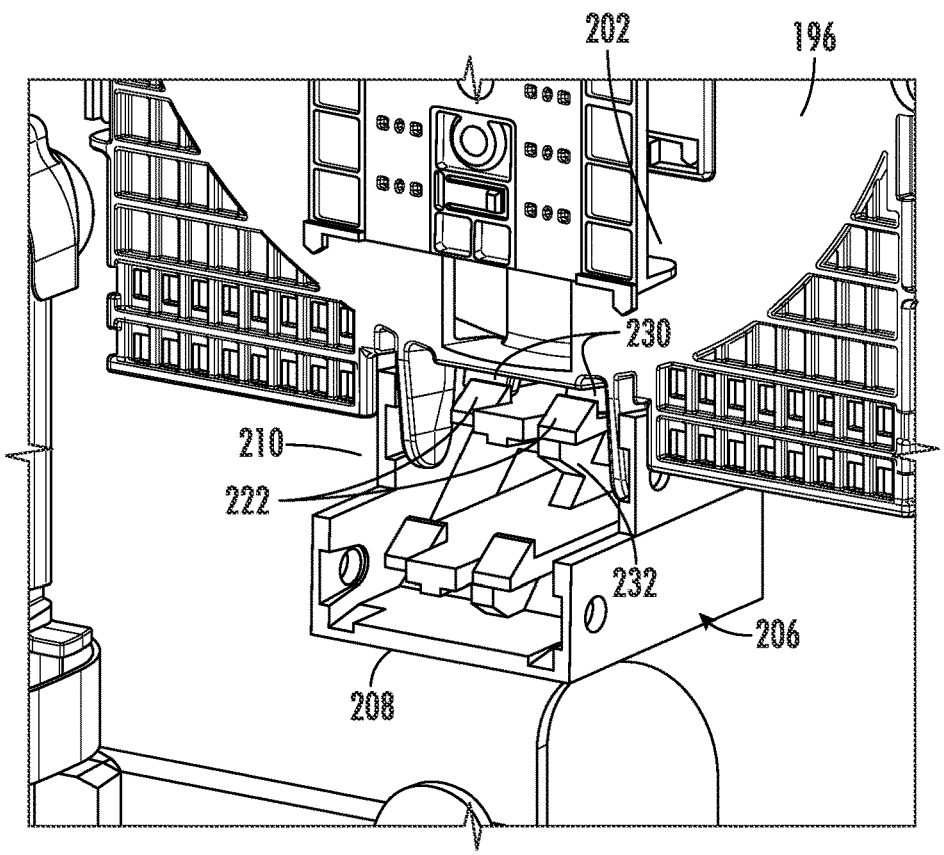
FIG. 8 is a front perspective view of a hinge mechanism for trays to be positioned in the enclosure in accordance with embodiments of the present disclosure.
Figure 9:
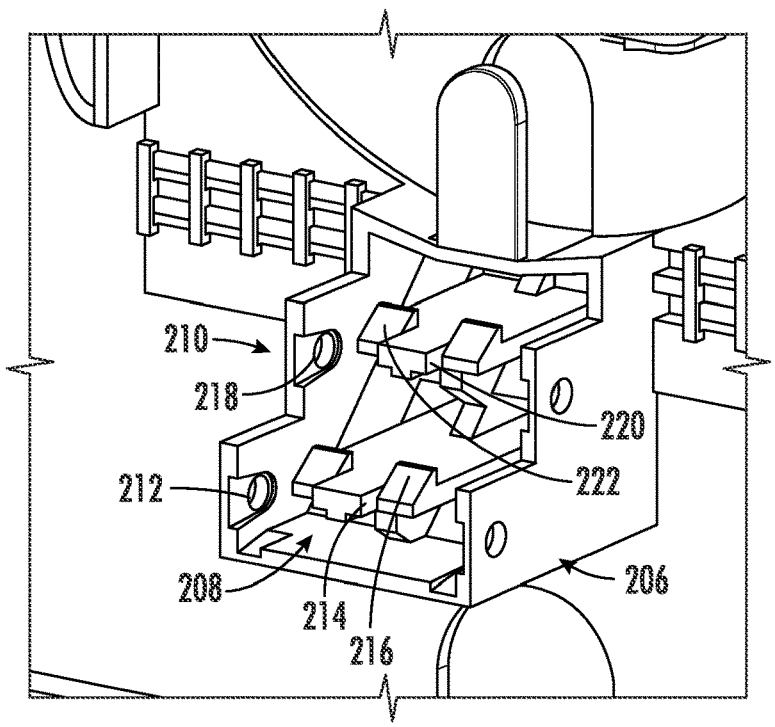
FIG. 9 is a front perspective view of a hinge mechanism for trays to be positioned in the enclosure in accordance with embodiments of the present disclosure.

FIGS. 7 to 9 illustrate a hinge mechanism 206 for the trays 196 in accordance with an exemplary embodiment. FIG. 7 depicts the first tray 202 coupled with the hinge mechanism 206. FIG. 8 depicts the second tray 204 coupled with the hinge mechanism 206. FIG. 9 depicts the hinge mechanism 206 without either of the first and second trays 202 and 204 coupled therewith.

Referring to FIG. 9, in accordance with an exemplary embodiment, the hinge mechanism 206 can include a multi-tiered hinge defining a first hinge 208 and a second hinge 210. The first hinge 208 can be configured to engage with the first tray 202 and the second hinge 210 can be configured to engage with the second tray 204. The first and second hinges 208 and 210 can be vertically offset from one another, laterally offset from one another, or both. In an embodiment, the first and second hinges 208 and 210 can be similar, or the same, as one another. In another embodiment, the first and second hinges 208 and 210 can have different relative constructions, shapes, designs, or operating principles. While the edges of the first and second hinges 208 and 210 are depicted with sharp corners (e.g., at an underside thereof), in an embodiment, at least some of the edges of the first or second hinges 208 or 210 can be rounded, chamfered, or the like so as to reduce cable pinch points when a cable is wrapped therearound.

The first hinge 208 can include a hinge point 212 and a locking feature 214 configured to secure the first tray 202 in the closed position. By way of example, the locking feature 214 can define a deformable tab configured to prevent rotation of the first tray 202. In certain instances, the deformable tab can deform when a technician applies sufficient rotational biasing force to the first tray 202, allowing the first tray 202 to pass over one or more latches 216 of the deformable tab. Alternatively, biasing, e.g., pushing downward on, the locking feature 214 or another feature connected thereto, such as the latches 216, can release the first tray 202, allowing the first tray 202 to rotate. The first hinge 208 can further include a stop feature 228 (FIG. 7) configured to form a bottoming out stop against excessive downward displacement of the locking feature 214.

The second hinge 210 can include any number of similar or different features as compared to the first hinge 208. For instance, the second hinge 210 can include a hinge point 218 and a locking feature 220. The locking feature 220 can define a deformable tab configured to prevent rotation of the second tray 204. In an embodiment, when a technician applies sufficient rotational biasing force to the second tray 204, the deformable tab can deform, allowing the second tray 204 to pass over one or more latches 222 of the deformable tab. Similar to the first tray 202, in another embodiment, pushing downward on the locking feature 214 or another feature connected thereto, such as the latches 222, can release the second tray 204, allowing the second tray 204 to rotate. In an embodiment, the second hinge 210 can include a stop feature 232 (FIG. 8) configured to form a bottoming out stop against excessive downward displacement of the locking feature 226.

FIG. 7 illustrates an exemplary coupling configuration between the first tray 202 and the first hinge 208. Tabs 224 of the first tray 202 can extend from the first tray 202 (e.g., vertically when the first tray 202 is in the stored position) and interact with the one or more latches 216. The tabs 224 can form an interference fit with the latches 216, preventing the first tray 202 from accidently pivoting to the open position. In an embodiment, the first hinge 208 can support the first tray 202 in the open position.

FIG. 8 illustrates an exemplary coupling configuration between the second tray 204 and the second hinge 210. Tabs 230 of the second tray 204 can extend from the second tray 204 (e.g., vertically when the second tray 204 is in the stored position) and interact with the one or more latches 222 of the second hinge 210. The tabs 230 can form an interference fit with the latches 222, preventing the second tray 204 from accidently pivoting to the open position. In an embodiment, a portion of the first hinge 208 can form a support surface for the second tray 204 when the second tray 204 is in the open position.

Referring again to FIG. 6, the enclosure 100 can further include a cable attachment element 308 disposed above at least a portion of the grommet system. The cable attachment element 308 can be secured to the housing, e.g., at the base 102, and permit an operator to secure a cable to the housing. In a particular instance, the cable attachment element 308 can be configured to attach a main trunk cable to the housing. The cable attachment element 308 can include a selective retention element 310 that can be operated on by the technician to attach the cable to the housing. In an embodiment, the selective retention element 310 can include a clamp, wrap, band, interference fit, snappable cover or articulatable clasp, or the like. The cable attachment element 308 can define a channel 312 in which the cable can be routed. In a non-limiting embodiment, the channel 312 can extend in a vertical direction, e.g., parallel with the axis A of the hinged interface 108.

Referring again to FIG. 5, the housing can further include a coupling feature 255 configured to connect to the incoming trunk cable. The coupling feature 255 can include, for instance, an area configured to receive a fastening strap, such as a Velcro strap, a zip tie, or the like. The fastening strap can be secured to the coupling feature 255 with the trunk cable disposed therein. In a specific embodiment, the trunk cable may include an outer layer which is removed prior to engagement with the coupling feature 255. One or more buffer tubes can then be coupled to the coupling feature 255. The cable (or a portion thereof) can then be routed through the enclosure, e.g., wrapped around a perimeter thereof, and inserted into splice trays 196.

Figure 10:
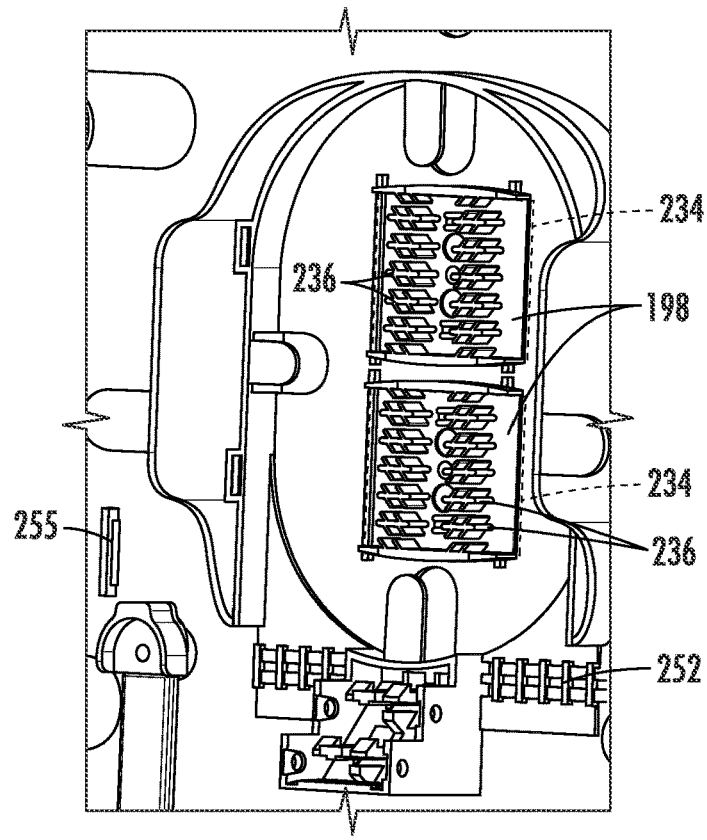
FIG. 10 is a front perspective view of a fiber management area disposed within the enclosure behind the trays and demarcation panel in accordance with embodiments of the present disclosure.

FIG. 10 illustrates an exemplary embodiment of the splice trays 198 described with respect to FIG. 5. In an embodiment, at least one of the splice trays 198 can include a receiving area 234 capable of holding one or more spliced sections of cable (e.g., optical fiber). For instance, a first cable can come from a left side of the receiving area 234 and a second cable can come from a right side of the receiving area 234. These two cables may be spliced together, with the spliced section therebetween disposed within the receiving area 234. The receiving area 234 can define a plurality of supports 236. The supports 236 can be arranged in a manner such that the receiving area 234 defines a plurality of discrete channels into which the spliced cables can be inserted. In an embodiment, the supports 236 can be deformable and the discrete channels between adjacent supports 236 can be narrower than the spliced cable to be received therein. In this regard, spliced sections of cables disposed between adjacent supports 236 can be held in place by compression fit. In an embodiment, the receiving area 234 of each splice tray 198 can be configured to receive at least 1 spliced cable, such as at least 6 spliced cables, such as at least 12 spliced cables, such as at least 18 spliced cables, such as at least 24 spliced cables, such as at least 30 spliced cables. Together, a pair of spice trays 198 and 198 can be configured to receive at least 24 spliced cables, such as at least 36 spliced cables, such as at least 48 spliced cables, such as at least 60 spliced cables.

One or more coupling features 253 can be disposed along the enclosure 100, such as along the intermediate member 183 (FIG. 5). The one or more coupling features 253 can be configured to receive a fastening strap and selectively couple one or more cables to the enclosure. The fastening strap can include, for example, a zip tie or a Velcro strap. The fastening strap can secure the cables to the enclosure prior to reaching the splice trays 196, after exiting the splice trays 196, or both.

Figure 11:
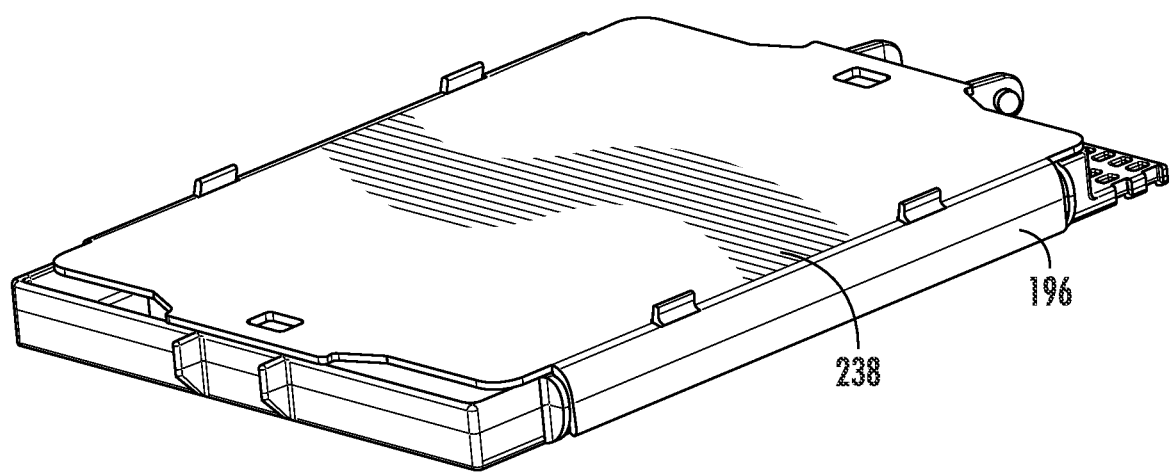
FIG. 11 is a perspective view of a pivotable tray for the enclosure in accordance with embodiments of the present disclosure.
Figure 12:
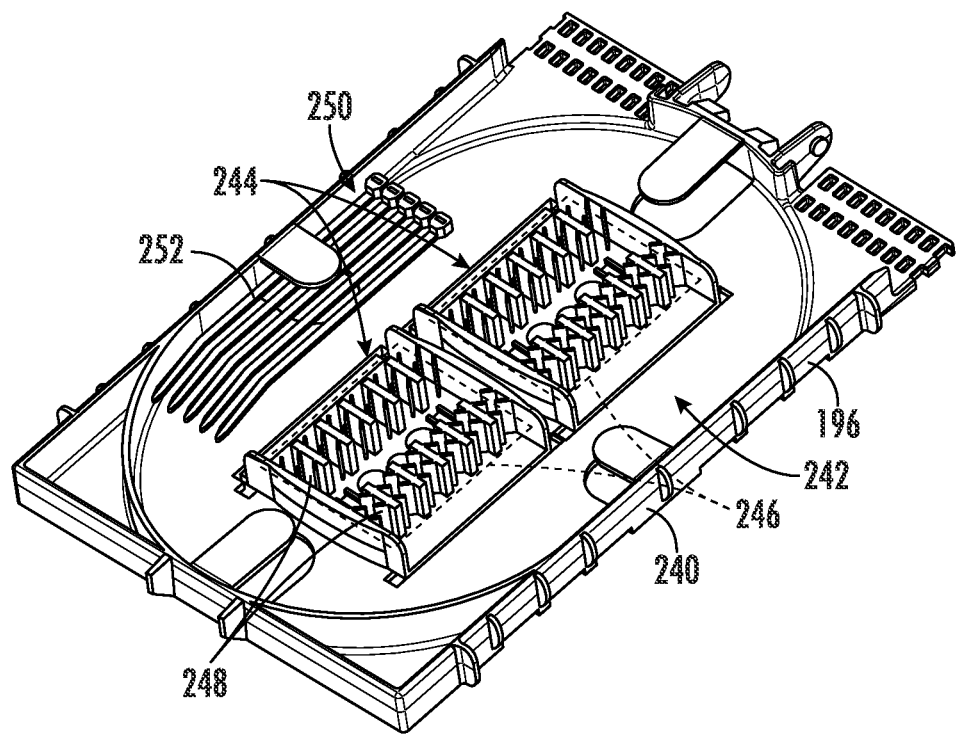
FIG. 12 is a perspective view of the pivotable tray in accordance with embodiments of the present disclosure.

FIGS. 11 and 12 illustrate an exemplary embodiment of the trays 196 detached from the hinge mechanism 206. FIG. 11 illustrates a perspective view of the tray 196 with a cover 238 attached. FIG. 12 illustrates a perspective view of the tray 196 with the cover 238 detached.

As depicted in FIG. 12, the tray 196 can include a housing 240 defining a volume 242 in which one or more splice trays 244 can be disposed within. In the exemplary embodiment, two splice modules 244 are disposed within the volume 242. In another embodiment, the volume 242 can house at least three splice modules 244, such as at least four splice modules 244, and so on. Similar to the splice trays 198 described above, the splice modules 244 can define a receiving area 246 capable of holding one or more spliced sections of cable. The receiving area 246 can define a plurality of supports 248. The supports 248 can be arranged in a manner such that the receiving area 246 defines a plurality of discrete channels into which the spliced cables can be inserted. In an embodiment, the supports 248 can be deformable and the discrete channels between adjacent supports 248 can be narrower than the spliced cable to be received therein. In this regard, spliced sections of cables disposed between adjacent supports 248 can be held in place by compression fit. In an embodiment, the receiving area 246 of each splice tray 244 can be configured to receive at least 1 spliced cable, such as at least 6 spliced cables, such as at least 12 spliced cables, such as at least 18 spliced cables, such as at least 24 spliced cables, such as at least 30 spliced cables. Together, a pair of spice modules 244 and 244 can be configured to receive at least 24 spliced cables, such as at least 36 spliced cables, such as at least 48 spliced cables, such as at least 60 spliced cables.

In an embodiment, the tray 196 can include a storage area 250 where one or more fastening elements 252 can be disposed. The fastening elements 252 can include, for instance, zip ties, cables, and the like. The fastening elements 252 can be used by the technician to secure the cables, cable splices, and the like to the tray 196.

Figure 13:
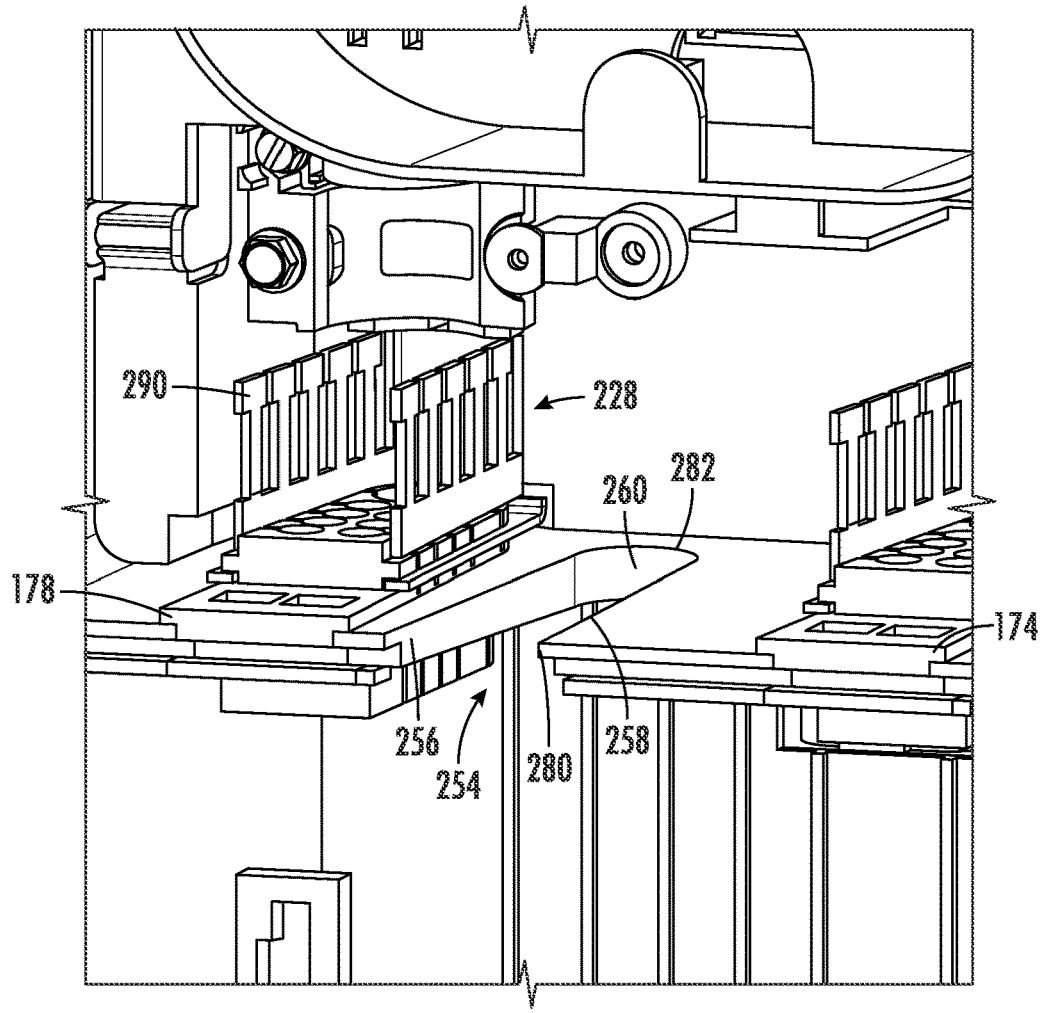
FIG. 13 is a perspective view of a grommet system for the enclosure in accordance with embodiments of the present disclosure.
Figure 14:
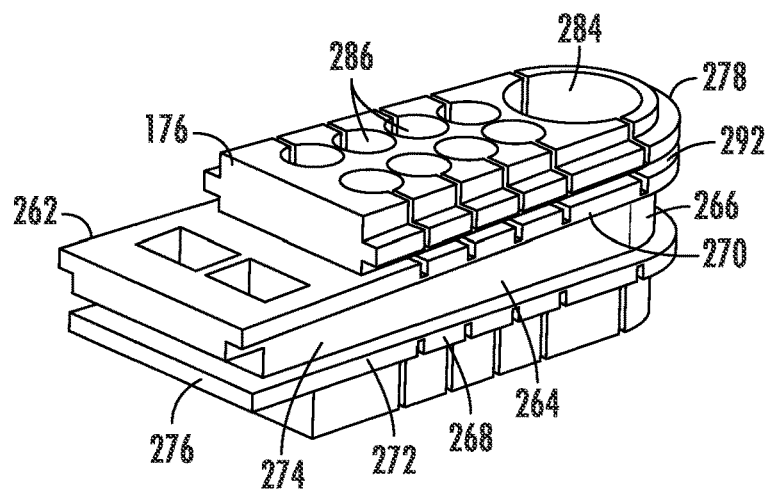
FIG. 14 is a perspective view of a grommet of the grommet system in accordance with embodiments of the present disclosure.

FIG. 13 illustrates an exemplary embodiment of the grommet system with one of the grommets removed. FIG. 14 illustrates an exemplary embodiment of the grommet (e.g., the first, second, third, or fourth grommet 172, 174, 176, or 178).

The grommet system can include a cutout 254 in the housing of the enclosure 100. The cutout 254 can be configured to receive one of the grommets (e.g., the first, second, third, or fourth grommet 172, 174, 176, or 178). The cutout 254 can be disposed in the bottom side 118 of the housing. In a non-illustrated embodiment, the cutout 254 can be disposed on a different side of the housing. In an embodiment, the cutout 254 can include a plurality of cutouts 254, such as at least two cutouts 254, such as at least three cutouts 254, such as at least four cutouts 254. Each of the plurality of cutouts 254 can receive one of the grommets (e.g., the first, second, third, or fourth grommet 172, 174, 176, or 178).

In the illustrated embodiment, the cutout 254 has an arcuate shape defined by two sidewalls 256 and 258 and a curved backwall 260. In other embodiments, the cutout 254 can have a different shape, such as a polygonal shape, e.g., a rectangular shape. The grommet 176 (illustrated in FIG. 14) can include a corresponding shape defined by two sidewalls 262 and 264 and a curved backwall 266. The shape of the grommet 176 can be a close fit with the shape of the cutout 254.

The grommet 176 can include a rail system 268 configured to help secure the grommet 176 within the cutout 254. The rail system 268 can include a plurality of rails, such as a first rail 270 and a second rail 272. The first and second rails 270 and 272 can define a gap 274 therebetween. The gap 274 can have a shape configured to closely fit within the cutout 254 such that the first and second rails 270 and 272 are disposed adjacent to inner and outer surfaces of the bottom side 118 of the housing. In the illustrated embodiment, the gap 274 can taper from a narrowest dimension at a front edge 276 of the grommet 176 and a widest dimension at a back edge 278 of the grommet 176. The cutout 254 can have a similar taper defined from a front edge 280 of the cutout 254 to a back edge 282 of the cutout 254. In this regard, the grommet 176 can have a close fit with the cutout 254.

The grommet 176 can define a plurality of passthroughs through which cables can be fed into the enclosure 100. The passthroughs can include a set of one or more first passthroughs 284 and a set of one or more second passthroughs 286. In an embodiment, the first and second passthroughs 284 and 286 can be different from one another. For instance, the dimensions of the passthroughs 284 and 286 can be different from one another. In another embodiment, the first and second passthroughs 284 and 286 can each be configured to be used with different types of cables. For instance, the first passthrough 284 can include a single passthrough configured to receive a main feeder cable. The main feeder cable has a larger diameter than a single cable. Accordingly, the first passthrough 284 can define a larger dimension to accommodate the larger cable. The second passthroughs 286 can include a plurality of passthroughs each configured to receive a cable smaller than the main feeder cable. In certain instances, at least one of the passthroughs of at least one of the first and second passthroughs 284 and 286 can have a closed aperture. That is, the passthroughs may be sealed or otherwise closed to prevent penetration of dirt, water, and other environmental elements. When a particular passthrough is required, the technician can open the passthrough to feed the cable therethrough. In such a manner, unused passthroughs can remain sealed and further protect the internal volume 106 (FIG. 1) of the enclosure 100.

Attachment protocol 288 can be disposed at a location near the grommet system to permit an operator to selectively attach cables entering and exiting the enclosure 100. The attachment protocol 288 can include, for example, a plurality of fingers 290 each configured to form a tie-down for the cables. In an embodiment, the attachment protocol 288 can be coupled to the grommet 176 at an attachment protocol interface 292.

While the above description is made with reference to the grommet 176, it should be understood that one or more of the features described with respect to grommet 176 can be included on any one or more of the other grommets (e.g., the first, second, or fourth grommet 172, 174, or 178).

In a non-illustrated embodiment, the grommet system can be replaced with a conduit system including conduits similar to those previously described on the top side 116 of the housing.

Figure 15:
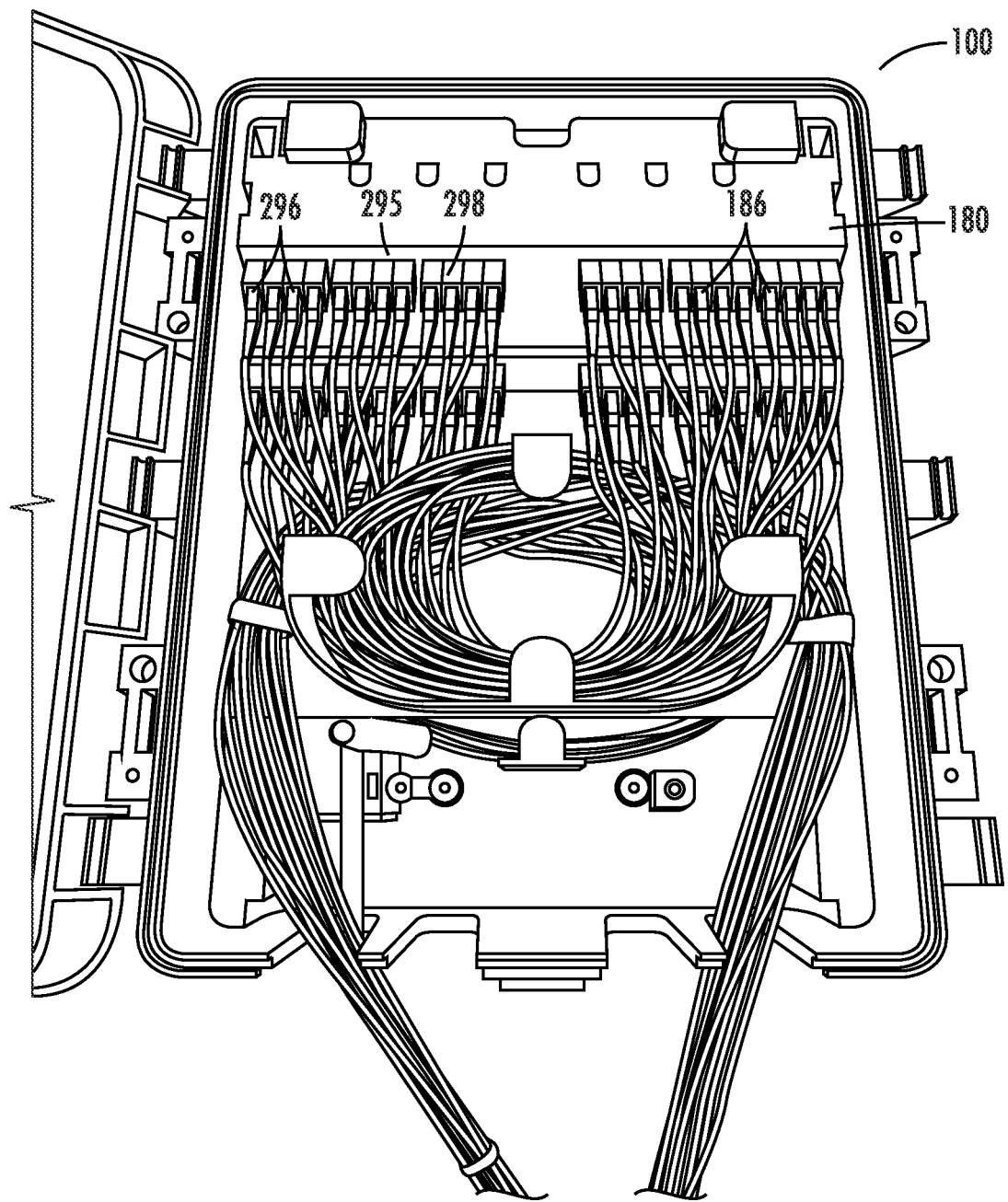
FIG. 15 is a front view of the enclosure with the demarcation panel in the closed position in accordance with embodiments of the present disclosure.

FIG. 15 illustrates a front view of the enclosure 100 with cables C routed therein. A first set 295 of connectors 186 on the demarcation panel 180 are depicted with covers 296 connected therewith so as to protect the connectors 186 from dirt, debris, and the like. A second set 298 of connects 186 on the demarcation panel 180 is shown without covers 296. Prior to installing the cables along the front side of the connectors 186, the connectors 186 may include covers 296 so as to prevent damage thereto. As the technician installs the cables, the covers can be discarded or moved to a storage area of the enclosure 100.

Figure 16:
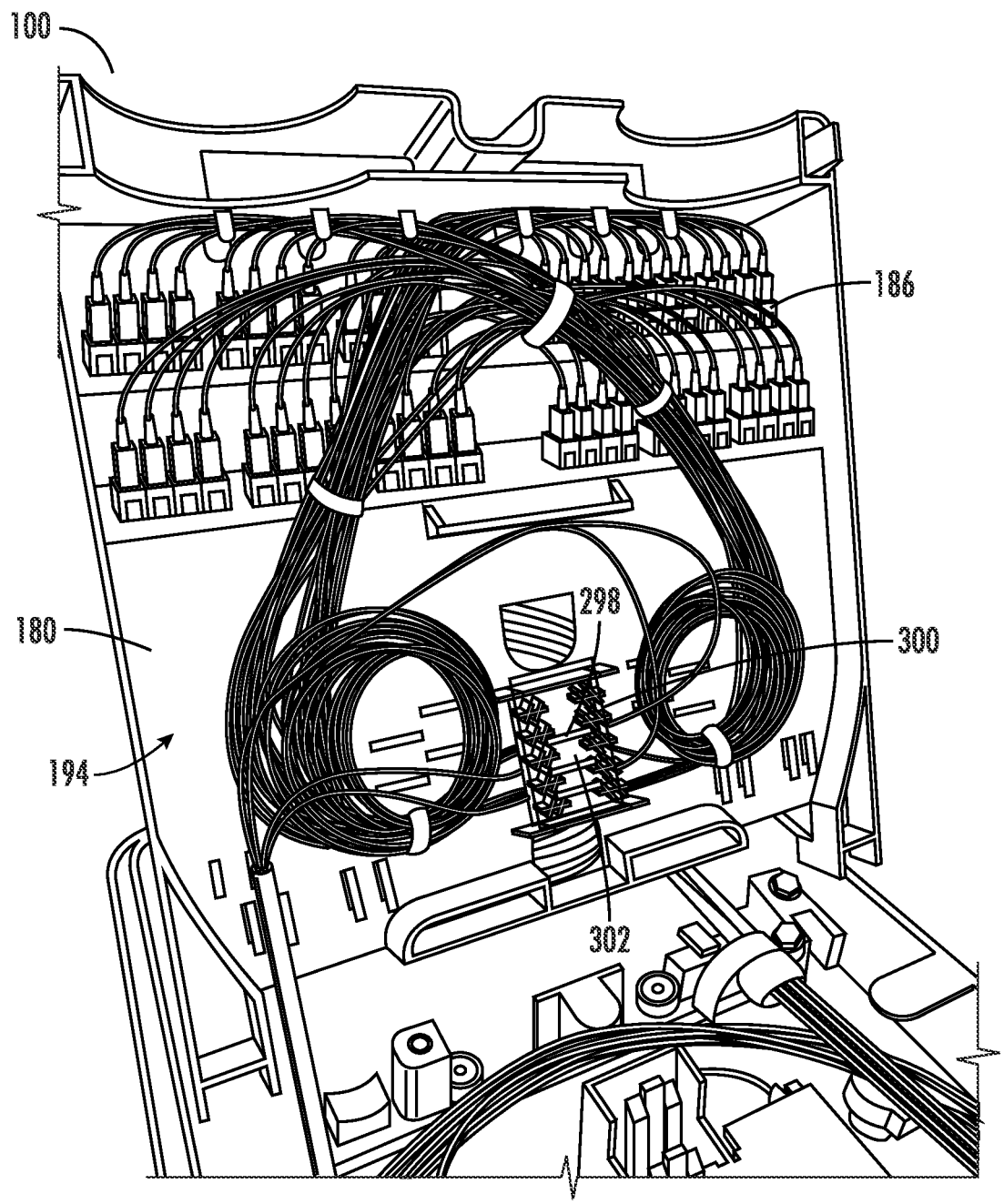
FIG. 16 is a front view of the enclosure with the demarcation panel inverted to show a back side of the demarcation panel in accordance with embodiments of the present disclosure.

FIG. 16 illustrates a front view of the enclosure 100 with the demarcation panel 180 flipped to show the back surface 194. A splice module 298 is coupled to the back surface 194 of the demarcation panel 180. The splice module 298 may be similar or different from the splice management area 198 or splice modules 244 previously described. Similar to the splice management area or splice modules 198 or 244 described above, the splice module 298 can define a receiving area 300 capable of holding one or more spliced sections of cable. The receiving area 300 can define a plurality of supports 302. The supports 302 can be arranged in a manner such that the receiving area 300 defines a plurality of discrete channels into which the spliced cables can be inserted. In an embodiment, the supports 302 can be deformable and the discrete channels between adjacent supports 302 can be narrower than the spliced cable to be received therein. In this regard, spliced sections of cables disposed between adjacent supports 302 can be held in place by compression fit. In an embodiment, the receiving area 300 of the splice tray 298 can be configured to receive at least 1 spliced cable, such as at least 6 spliced cables, such as at least 12 spliced cables, such as at least 18 spliced cables, such as at least 24 spliced cables, such as at least 30 spliced cables. In an embodiment, the splice tray 298 can include a plurality of splice trays 298.

Cables can be routed to the splice module 298 and fan out to connect with the back sides of connectors 186. In this regard, cables can be routed into the enclosure 100 through the grommet system. The cables can be spliced or otherwise manipulated behind the demarcation panel 180 and be connected to the connectors 186 along the back surface 194 of the demarcation panel 180. The front side of the demarcation panel 180 can allow for discrete connections to individual subscriber locations which can be installed without needing to access the upstream cables or cable connections. In such a manner, once the demarcation panel 180 is in the closed position, future technicians can work on the enclosure 100 without damaging the main feeder cable or any other upstream cables. The future technician can use a plug-and-play approach, connecting the subscriber cables to the front of the connectors 186 and routing those subscriber cables out of the enclosure 100.

Figure 17:
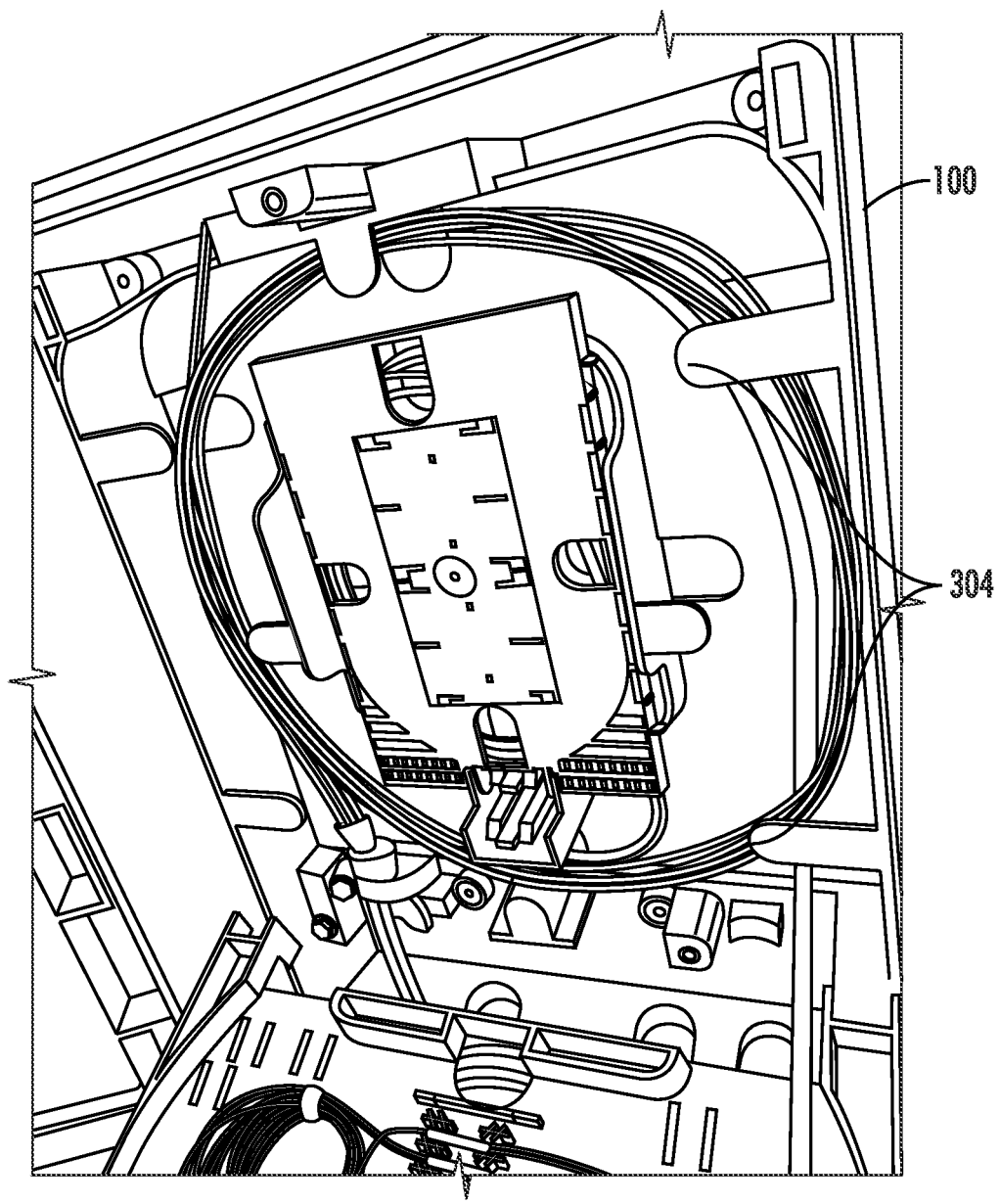
FIG. 17 is a front view of the enclosure with the demarcation panel removed to show the cable routing in accordance with embodiments of the present disclosure.

FIG. 17 illustrates an exemplary cable path through the enclosure 100. The cable path permits the technician to wind the cables behind the demarcation panel (not shown) to take up extra cable and allow for future modification. One or more guide features 304 can be disposed within the enclosure 100 to provide a bend radius limiting corner for wrapping the cable without causing kinking or other damage. In an embodiment, the one or more guide features 304 can prevent the cable from undesirably pulling out of the enclosure 100.

In operation, enclosures in accordance with one or more embodiments described herein can be particularly suitable for installing telecommunications systems for multi-subscriber locations. The enclosures can allow an initial installation technician to route a main trunk cable into the enclosure and create a plurality of connectorized ports each capable of receiving a subscriber cable. Advantageously, the main trunk cable and associated parts which allow for creation of the connectorized ports can be disposed behind the demarcation panel so as to prevent accidental disconnecting or damage by a future technician. The future technician can simply plug subscriber cables into the connectors on the front of the demarcation panel without requiring further knowledge and without danger of accidently damaging the main trunk cable.

Further aspects of the invention are provided by one or more of the following embodiments:

Embodiment 1. A terminal enclosure for a telecommunications system, the terminal enclosure comprising: a housing including a base and a cover, the housing defining an internal volume configured to receive one or more telecommunication elements therein, wherein the base includes a first side and a second side opposite the first side, wherein the base and cover are pivotally coupled together at a hinged interface to selectively close the internal volume of the housing, and wherein the hinged interface is reconfigurable between the first and second sides of the base.

Embodiment 2. The terminal enclosure of any one or more of the embodiments, wherein the base comprises at least one hinge extending from each of the first and second sides, and wherein the cover comprises a mating interface configured to be coupled to the at least one hinge on the first side or the second side of the base.

Embodiment 3. The terminal enclosure of any one or more of the embodiments, wherein the cover is disposed at a first rotational orientation when the hinged interface is at the first side, and a second rotational orientation when the hinged interface is at the second side, and wherein the first and second rotational orientations are approximately 180 degrees offset from one another.

Embodiment 4. The terminal enclosure of any one or more of the embodiments, wherein the base comprises one or more components of the hinged interface at the first side and one or more components of the hinged interface at the second side, and wherein the one or more components of the hinged interface at the first side and the one or more components of the hinged interface at the second side are reflectively symmetrical about a plane extending between a top side and a bottom side of the base.

Embodiment 5. The terminal enclosure of any one or more of the embodiments, wherein the cover is displaceable within a range of angles, $\alpha$, as measured relative to the base along a rotational axis formed by the hinged interface, and wherein the cover is removable from the base along a range of angles, $\beta$, that is less than $\alpha$.

Embodiment 6. The terminal enclosure of any one or more of the embodiments, wherein the cover is removable from the base when a relative angle between the cover and base is approximately 90 degrees.

Embodiment 7. The terminal enclosure of any one or more of the embodiments, wherein the enclosure further comprises: a grommet system, the grommet system including one or more grommets which can be removably inserted into one or more cutouts of the housing; and a sealing element disposed between the one or more grommets and the cover when the cover is in the closed position.

Embodiment 8. The terminal enclosure of any one or more of the embodiments, wherein the demarcation panel is configured to pivot about a demarcation panel pivot axis, $A_{DP}$, wherein $A_{DP}$ is generally horizontal when the housing is mounted on an underlying surface, and wherein $A_{DP}$ is spaced apart from a bottom wall of the housing in a vertical direction.

Embodiment 9. The terminal enclosure of any one or more of the embodiments, wherein the enclosure further comprises one or more trays disposed behind the demarcation panel, the one or more trays being configured to rotate between stored and accessible positions along rotational axis that are generally parallel with a demarcation panel pivot axis, $A_{DP}$, of the demarcation panel, wherein the trays are configured to rotate on a hinge mechanism, wherein the hinge mechanism comprises a plurality of hinges, each hinge being associated with one of the trays, and wherein the hinges are offset from another in a vertical direction, a horizontal direction, or both.

Embodiment 10. A terminal enclosure for a telecommunications system, the terminal enclosure comprising: a housing including a base and a cover, the housing defining an internal volume configured to receive one or more telecommunication elements therein, wherein the base and cover are pivotally coupled together at a hinged interface to selectively close the internal volume of the housing; and a demarcation panel disposed in the housing and pivotally coupled to the housing through a demarcation panel axis that is approximately orthogonal to an axis of the hinged interface, wherein the demarcation panel is reconfigurable between a stored configuration in which at least one the one or more telecommunication elements are not accessible and a deployed configuration in which the at least one telecommunication element is accessible, and wherein the demarcation panel is configured to be selectively retained in the stored configuration using a quick connect retention element.

Embodiment 11. The terminal enclosure of any one or more of the embodiments, wherein the demarcation panel is further configured to be selectively retained in the stored configuration using a fastener.

Embodiment 12. The terminal enclosure of any one or more of the embodiments, wherein the housing comprises upper cable openings extending through a top wall of the housing and lower cable openings extending through a bottom wall of the housing, wherein the demarcation cover is configured to prevent access to the upper cable openings within the internal volume when the demarcation cover is in the stored configuration, and wherein at least a portion of the lower cable openings are accessible when the demarcation cover is in the stored configuration.

Embodiment 13. The terminal enclosure of any one or more of the embodiments, wherein the enclosure further comprises one or more trays disposed behind the demarcation panel, the one or more trays being configured to rotate between stored and accessible positions along rotational axis that are generally parallel with a demarcation panel pivot axis, $A_{DP}$, of the demarcation panel.

Embodiment 14. The terminal enclosure of any one or more of the embodiments, wherein the trays are configured to rotate on a hinge mechanism, wherein the hinge mechanism comprises a plurality of hinges, each hinge being associated with one of the trays, and wherein the hinges are offset from another in a vertical direction, a horizontal direction, or both.

Embodiment 15. A terminal enclosure for a telecommunications system, the terminal enclosure comprising: a housing including a base and a cover, the housing defining an internal volume configured to receive one or more telecommunication elements therein, wherein the base and cover are pivotally coupled together at a hinged interface to selectively close the internal volume of the housing, wherein the housing comprises a lower cable opening extending through a bottom wall of the housing and configured to route telecommunication cables to and from the housing; and a skirt system disposed adjacent to the bottom wall of the housing and configured to protect the telecommunication cables extending from the housing to an underlying ground level surface.

Embodiment 16. The terminal enclosure of any one or more of the embodiments, wherein the skirt system comprises a first skirt and a second skirt, wherein the first and second skirts are fungible.

Embodiment 17. The terminal enclosure of any one or more of the embodiments, wherein the skirt system includes a plurality of skirts, wherein at least one of the plurality of skirts includes a multi-piece construction comprising a first member and a second member configured to be coupled to the second member, and wherein the first and second members together are configured to cover the telecommunication cables.

Embodiment 18. The terminal enclosure of any one or more of the embodiments, wherein the first and second members each include skirt attachment protocol configured to independently couple the skirt system to an underlying surface or object, and wherein the skirt attachment protocol of the first and second members are configured to be coaxially aligned with one another.

Embodiment 19. The terminal enclosure of any one or more of the embodiments, wherein the first and second skirt abut one another at a sealed interface.

Embodiment 20. The terminal enclosure of any one or more of the embodiments, wherein the skirt system is configured to abut the bottom wall of the housing, and wherein the cover is configured to contact at least one skirt of the skirt system when the cover is in the closed position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A terminal enclosure for a telecommunications system, the terminal enclosure comprising:
   a housing including a base and a repositionable cover, the housing defining an internal volume configured to receive one or more telecommunication elements therein including at least one tray pivotable about an axis, wherein the base includes a first side and a second side opposite the first side, wherein the first side and second side include same mounting features with a common layout, wherein the base and cover are pivotally coupled together at a hinged interface to selectively close the internal volume of the housing, wherein the hinged interface comprises a first hinged interface formed by the mounting features of the first side of the base and a second hinged interface formed by the mounting features of the second sides of the base, and wherein the cover is swappable between the first and second hinged interfaces; and
   a demarcation panel disposed in the housing and pivotally coupled to the housing through a demarcation panel axis, wherein the demarcation panel defines a connector interface region configured to receive one or more connectors, wherein the demarcation panel is pivotable about an axis between an open position whereby the at least one tray is accessible and a closed position whereby the at least one tray is inaccessible, wherein the axis of the at least one tray and demarcation panel are parallel with one another, wherein the axis of the demarcation panel is disposed at a lower elevation than the axis of the at least one tray, and wherein in the open position a back surface of the demarcation panel is usable by a technician to support one or more optical fibers to be installed in the enclosure.

2. The terminal enclosure of claim 1, wherein the at least one tray comprises a plurality of trays vertically offset from one another, and wherein the demarcation panel covers all of the plurality of trays when the demarcation panel is in the closed position.

3. The terminal enclosure of claim 2, further comprising a splice management area including a splice module, wherein all of the plurality of trays is disposed between the demarcation panel and the splice module when the demarcation panel is in the closed position.

4. The terminal enclosure of claim 1, further comprising a skirt system disposed adjacent to a bottom wall of the housing, the bottom wall disposed between the first and second sides, wherein the skirt system is configured to protect the telecommunication cables extending from the housing to an underlying ground level surface.

5. The terminal enclosure of claim 1, wherein the demarcation panel is coupled to the housing through an intermediate member having a close fit with the first and second sides and a bottom wall of the housing, and wherein the at least one tray is pivotally coupled to the intermediate member.

6. The terminal enclosure of claim 1, wherein the cover is removable from the base when a relative angle between the cover and base is approximately 90 degrees.

7. The terminal enclosure of claim 1, wherein the enclosure further comprises:
   a grommet system, the grommet system including one or more grommets which can be removably inserted into one or more cutouts of the housing; and
   a sealing element disposed between the one or more grommets and the cover when the cover is in the closed position.

8. The terminal enclosure of claim 1, wherein the demarcation panel is configured to pivot about a demarcation panel pivot axis, App, wherein App is generally horizontal when the housing is mounted on an underlying surface, and wherein App is spaced apart from a bottom wall of the housing in a vertical direction.

9. The terminal enclosure of claim 1, wherein the demarcation panel comprises a splice module coupled to a back surface of the demarcation panel, the back surface disposed between the demarcation panel and the at least one tray when the demarcation panel is in the closed position.

10. A terminal enclosure for a telecommunications system, the terminal enclosure comprising:
    a housing including a base and a cover, the housing defining an internal volume configured to receive one or more telecommunication elements therein including a plurality of trays, wherein the base and cover are pivotally coupled together at a hinged interface to selectively close the internal volume of the housing, wherein the housing includes a first sidewall and a second sidewall opposite the first sidewall, a bottom sidewall and a top sidewall opposite the bottom sidewall, wherein openings are formed in each of the bottom sidewall and the top sidewall; and
    a demarcation panel disposed in the housing and pivotally coupled to the housing through a demarcation panel axis that is approximately orthogonal to an axis of the hinged interface, wherein the demarcation panel is reconfigurable between a stored configuration in which the plurality of trays is not accessible and a deployed configuration in which the plurality of trays is accessible, and wherein the demarcation panel is configured to be selectively retained in the stored configuration using a quick connect retention element.

11. The terminal enclosure of claim 10, further comprising a splice management area including a splice module, wherein all of the plurality of trays is disposed between the demarcation panel and the splice module when the demarcation panel is in the stored configuration.

12. The terminal enclosure of claim 10, wherein the housing comprises upper cable openings extending through a top wall of the housing and lower cable openings extending through a bottom wall of the housing, wherein the demarcation cover is configured to prevent access to the upper cable openings within the internal volume when the demarcation cover is in the stored configuration, and wherein at least a portion of the lower cable openings are accessible when the demarcation cover is in the stored configuration.

13. The terminal enclosure of claim 10, wherein the enclosure further comprises one or more trays disposed behind the demarcation panel, the one or more trays being configured to rotate between stored and accessible positions along rotational axis that are generally parallel with a demarcation panel pivot axis, $A_{DP}$, of the demarcation panel.

14. The terminal enclosure of claim 13, wherein the trays are configured to rotate on a hinge mechanism, wherein the hinge mechanism comprises a plurality of hinges, each hinge being associated with one of the trays, and wherein the hinges are offset from another in a vertical direction, a horizontal direction, or both.

15. A terminal enclosure for a telecommunications system, the terminal enclosure comprising:
a housing including a base and a cover, the housing defining an internal volume configured to receive one or more telecommunication elements therein, wherein the base and cover are pivotally coupled together at a hinged interface to selectively close the internal volume of the housing, wherein the housing comprises a lower cable opening extending through a bottom wall of the housing and configured to route telecommunication cables to and from the housing; and
a skirt system disposed adjacent to the bottom wall of the housing and configured to protect the telecommunication cables extending from the housing to an underlying ground level surface, the skirt comprising a plurality of skirt segments arranged in a column, the plurality of skirt segments comprising a first skirt segment and a second skirt segment, the first skirt segment abuts the bottom wall of the housing and is disposed between the bottom wall and the second skirt segment, wherein the first and second skirt segments are fungible, and wherein each of the plurality of skirt segments includes a skirt attachment configured to independently couple the respective skirt segment to an underlying surface.

16. The terminal enclosure of claim 15, wherein the one or more telecommunication elements includes a plurality of trays and a demarcation panel movable between a closed position whereby access to the plurality of trays is prevented and an open position whereby access to the plurality of trays is allowed.

17. The terminal enclosure of claim 15, wherein at least one of the plurality of skirt segments includes a multi-piece construction comprising a first member and a second member configured to be coupled to the second member, and wherein the first and second members together are configured to cover the telecommunication cables.

18. The terminal enclosure of claim 17, wherein the first member is a cover and the second member is a backplate, wherein the second member comprises the skirt attachment in the form of a plurality of openings each configured to receive a fastener, and wherein the first and second members snap fit together.

19. The terminal enclosure of claim 17, wherein the first and second skirt abut one another at a sealed interface.

20. The terminal enclosure of claim 15, wherein the cover is configured to contact the first skirt segment when the cover is in the closed position.

* * * * *